(12) United States Patent
Feyen et al.

(10) Patent No.: US 9,475,041 B2
(45) Date of Patent: Oct. 25, 2016

(54) ZEOLITIC MATERIALS AND METHODS FOR THEIR PREPARATION USING ALKENYLTRIALKYLAMMONIUM COMPOUNDS

(71) Applicant: BASF SE, Ludwigshafen (DE)

(72) Inventors: Mathias Feyen, Hirschberg (DE); Ulrich Mueller, Neustadt (DE); Andrei-Nicolae Parvulescu, Heidelberg (DE); Bernd Bastian Schaack, Ludwigshafen (DE); Sebastian Ahrens, Wiesloch (DE); Dirk Gerhard, Mannheim (DE); Sunghee Son, Mannheim (DE); Gabriele Iffland, Heidelberg (DE); Bianca Seelig, Cologne (DE)

(73) Assignee: BASF SE, Ludwigshafen (DE)

( * ) Notice: Subject to any disclaimer, the term of this patent is extended or adjusted under 35 U.S.C. 154(b) by 492 days.

(21) Appl. No.: 13/869,418

(22) Filed: Apr. 24, 2013

(65) Prior Publication Data

US 2013/0296159 A1 Nov. 7, 2013

Related U.S. Application Data

(60) Provisional application No. 61/637,321, filed on Apr. 24, 2012.

(51) Int. Cl.

| C01B 39/40 | (2006.01) |
|---|---|
| B01J 29/89 | (2006.01) |
| B01J 29/40 | (2006.01) |
| B01J 29/00 | (2006.01) |
| B01J 29/035 | (2006.01) |
| B01J 29/06 | (2006.01) |
| C01B 39/04 | (2006.01) |
| C01B 39/08 | (2006.01) |
| B01J 20/18 | (2006.01) |
| B01J 20/30 | (2006.01) |
| B01J 20/28 | (2006.01) |
| C01B 37/02 | (2006.01) |

(52) U.S. Cl.
CPC ............ B01J 29/89 (2013.01); B01J 20/186 (2013.01); B01J 20/28057 (2013.01); B01J 20/3085 (2013.01); B01J 29/00 (2013.01); B01J 29/035 (2013.01); B01J 29/06 (2013.01); B01J 29/40 (2013.01); C01B 37/02 (2013.01); C01B 39/04 (2013.01); C01B 39/085 (2013.01); C01B 39/40 (2013.01); *B01J 2229/183* (2013.01)

(58) Field of Classification Search
CPC ......... C01B 39/38; C01B 39/40; B01J 29/40
See application file for complete search history.

(56) References Cited

U.S. PATENT DOCUMENTS

| 3,702,886 | A | 11/1972 | Argauler et al. |
| 4,410,501 | A | 10/1983 | Taramasso et al. |
| 4,544,538 | A | 10/1985 | Zones |
| 4,565,681 | A | 1/1986 | Kühl |
| 5,783,321 | A * | 7/1998 | Verduijn ............... B01J 29/04 423/702 |
| 5,919,430 | A | 7/1999 | Hasenzahl et al. |
| 8,007,763 | B2 | 8/2011 | Zones |
| 8,232,296 | B2 * | 7/2012 | Briggner ............ C07D 401/14 514/333 |
| 2001/0001656 | A1 | 5/2001 | Hasenzahl et al. |
| 2001/0055562 | A1 | 12/2001 | Hasenzahl et al. |
| 2007/0135637 | A1 | 6/2007 | Bosch et al. |
| 2008/0000354 | A1 | 1/2008 | Muller et al. |
| 2012/0165558 | A1 | 6/2012 | Ryoo et al. |

FOREIGN PATENT DOCUMENTS

| CN | 1089574 A | 7/1994 |
| CN | 1168860 A | 12/1997 |
| CN | 1401569 A | 3/2003 |
| CN | 101935053 A | 1/2011 |
| EP | 2906554 A1 * | 8/2015 |
| WO | WO 2007/021404 A1 | 2/2007 |
| WO | WO 2008/083045 A2 | 7/2008 |
| WO | WO 2010/150996 A2 | 12/2010 |

OTHER PUBLICATIONS

Jenkins, Introduction to X-ray Powder Diffractometry, Chapter 3, pp. 47-95, (1996).*
Goodsen, Challenges and Strategies for Patenting New Solid Forms, FISH, (Sep. 2014) pp. 1-50.*
International Search Report and Written Opinion of the International Searching Authority issued Sep. 19, 2013 in PCT/EP2013/058481 filed Apr. 24, 2013.

(Continued)

*Primary Examiner* — David M Brunsman
(74) *Attorney, Agent, or Firm* — Oblon, McClelland, Maier & Neustadt, L.L.P.

(57) ABSTRACT

The present invention relates to a process for the preparation of a zeolitic material comprising the steps of:

(1) providing a mixture comprising one or more sources for $YO_2$ and one or more alkenyltrialkylammonium cation $R^1R^2R^3R^4N^+$-containing compounds as structure directing agent; and (2) crystallizing the mixture obtained in step (1) to obtain a zeolitic material;

wherein Y is a tetravalent element, and wherein $R^1$, $R^2$, and $R^3$ independently from one another stand for alkyl; and $R^4$ stands for alkenyl, as well as to zeolitic materials which may be obtained according to the inventive process and to their use.

14 Claims, 10 Drawing Sheets

(56) References Cited

OTHER PUBLICATIONS

Anuji Abraham, et al. "TRAPDOR double-resonance and high-resolution MAS NMR for structural and template studies in zeolite ZSM-5" Solid State Nuclear Magnetic Resonance, vol. 35, No. 2 XP026065004, Feb. 10, 2009, pp. 61-66.

N.L. Chauhan, et al. "Synthesis of small-sized ZSM-5 zeolites employing mixed structure directing agents" Materials Letters, vol. 74, XP028465795, Jan. 21, 2012, pp. 115-117.
First Office Action issued Nov. 19, 2015 in Chinese Patent Application No. 201380033336.1 with English translation.
Chinese Search Report issued Nov. 11, 2015 in Chinese Patent Application No. 201380033336.1.

* cited by examiner

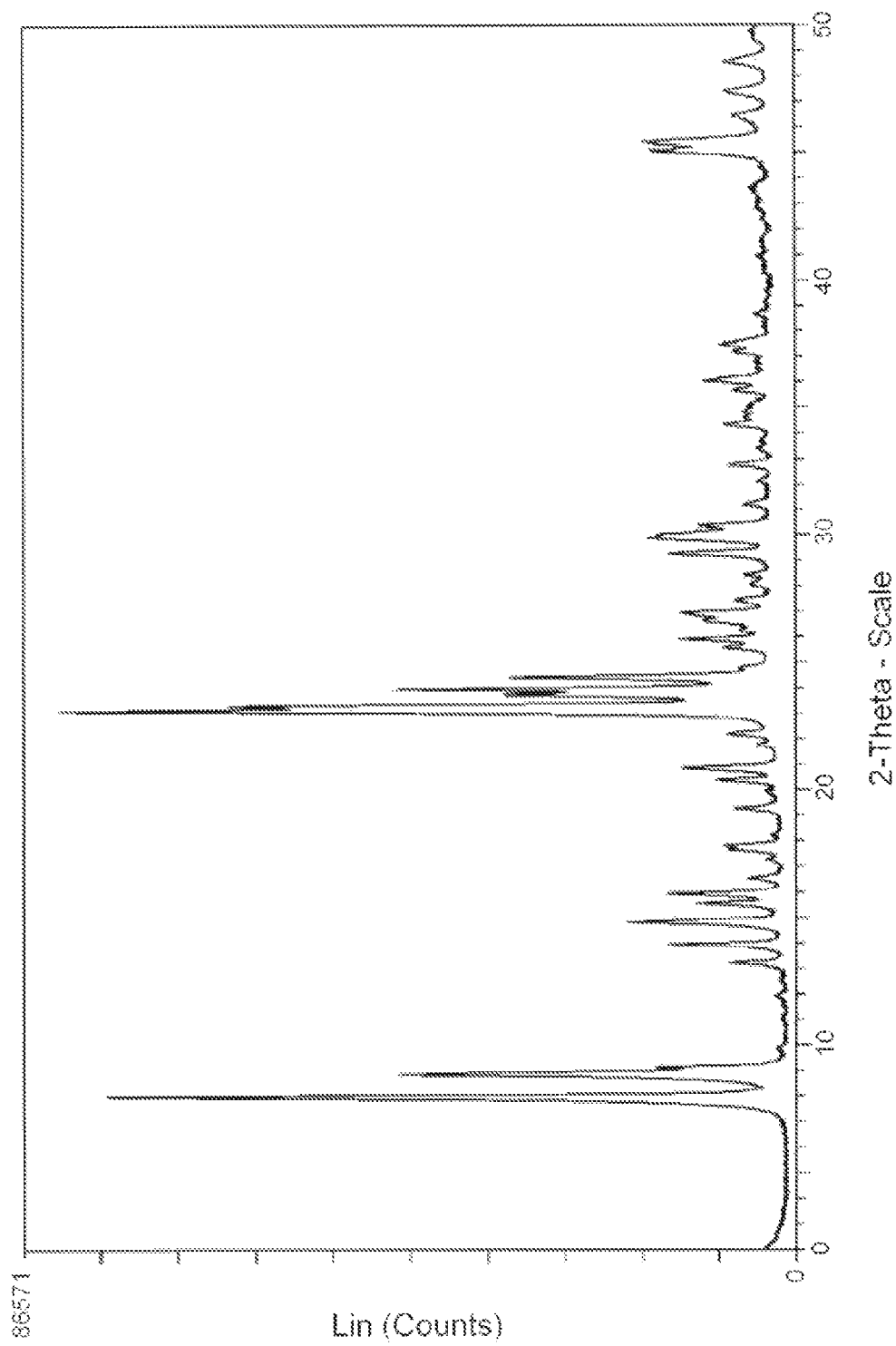

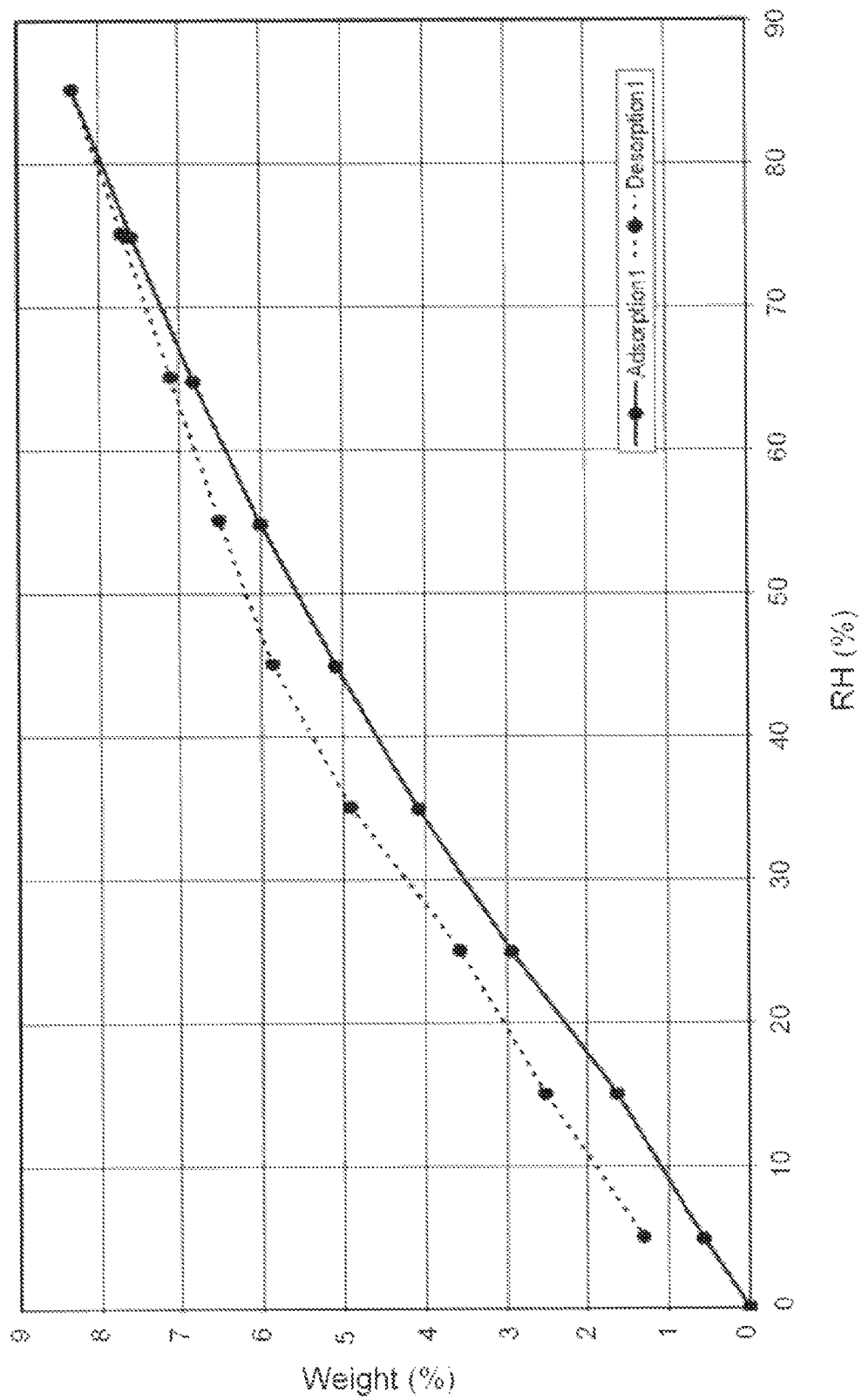

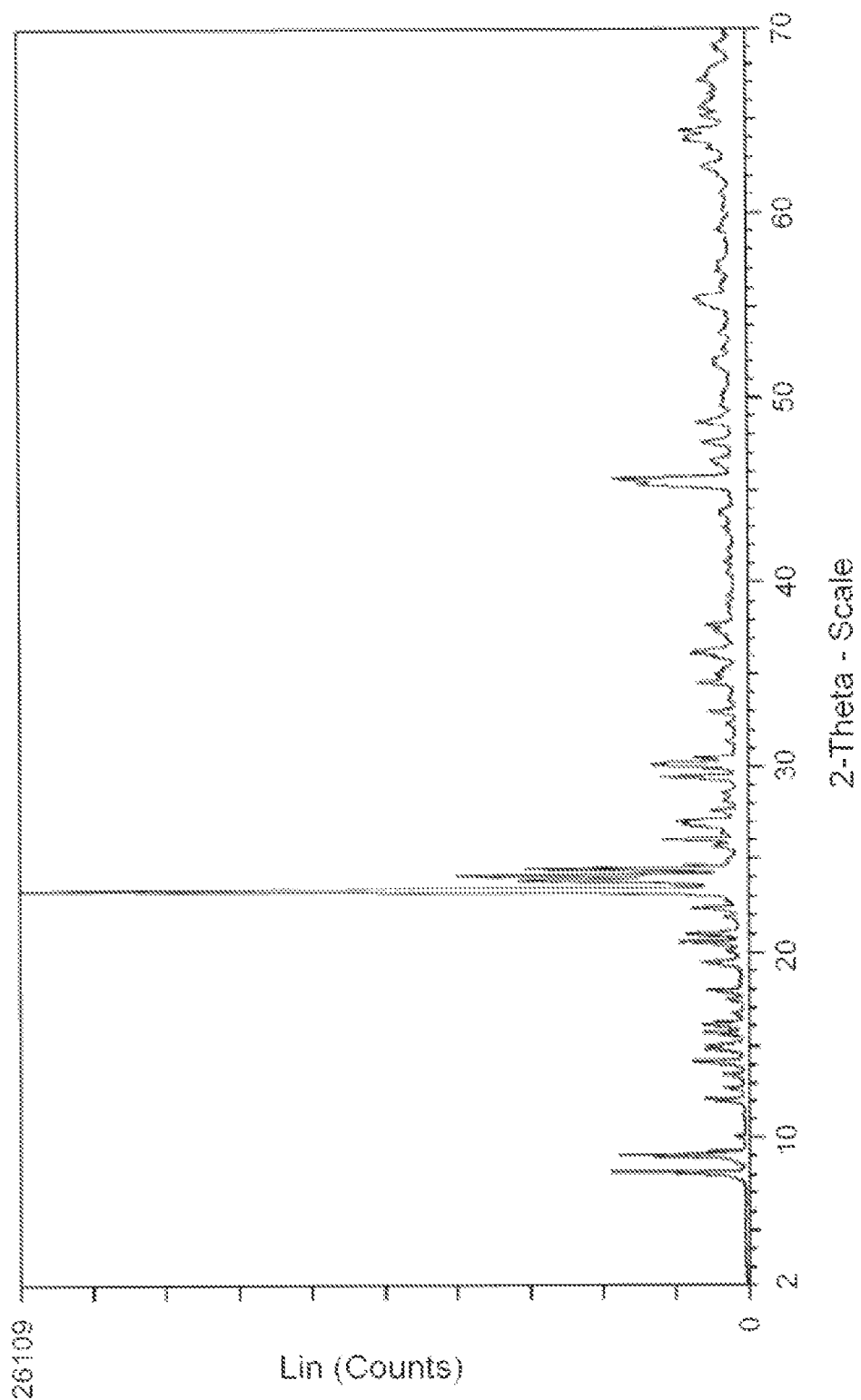

ZEOLITIC MATERIALS AND METHODS FOR THEIR PREPARATION USING ALKENYLTRIALKYLAMMONIUM COMPOUNDS

The present invention relates to a process for the preparation of a zeolitic material as well as to a zeolitic material having an MFI-type framework structure as such and as obtainable from the inventive process, as well as to the use of the inventive zeolitic materials in specific applications. Furthermore, the present invention relates to the use of an alkenyltrialkylammonium cation containing an alkenyl moiety as structure directing agent in the synthesis of microporous materials, and in particular in the synthesis of zeolitic materials.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001). Among said materials, those displaying the MFI-type framework structure constitute an important class of zeolitic materials which are used in a variety of applications and have in particular gained importance in chemical industry and notably in the field of petrochemistry. Furthermore, many zeolitic materials displaying the MFI-type framework structure have found use in the important field of heterogeneous catalysis. As prominent examples of zeolitic materials which have found use in these technical fields, ZSM-5 and the titanium silicalite TS-1 may be mentioned.

Typically, as for many microporous materials, zeolitic materials having the MFI framework-structure are synthesized with the aid of organotemplates employed as structure directing agents in the self-organization processes leading to their crystallization. In this respect, quarternary ammonium containing compounds are often employed, as for example for the synthesis of the aforementioned zeolites having the MFI-type framework structure ZSM-5 and TS-1. More specifically, U.S. Pat. No. 3,702,886 for example relates to ZSM-5 and to its synthesis using tetrapropylammonium as the structure directing agent in synthesis. U.S. Pat. No. 4,410,501 on the other hand relates to the TS-1 zeolite and to its synthesis which, as for ZSM-5, may be achieved with the aid of tetrapropylammonium-containing compounds. Further examples for procedures for the synthesis of zeolitic materials with the aid of tetraalkylammonium compounds may for example be found in US 2007/0135637 A1 and US 2008/0000354 A1.

U.S. Pat. No. 8,007,763 B2, U.S. Pat. No. 8,007,763 B2, and WO 2008/083045 A2, on the other hand, relate to zeolitic materials and their synthesis employing benzyl trimethylammonium-containing compounds either in combination with seed crystals or with a further organotemplate material. As concerns further examples of quarternary ammonium compounds used as structure directing agents in the synthesis of microporous materials, WO 2007/021404 A1 may be cited, which relates to the synthesis of aluminophosphate or silicoaluminophosphate molecular sieves employing trialkylammonium compounds including either a cycloalkyl, a heterocyclic, or an aromatic moiety as the fourth substituent constituting the quaternary ammonium cation contained therein. Examples for the use of more complex quaternary ammonium compounds in the synthesis of zeolitic materials may for example be found in U.S. Pat. No. 4,544,538, which specifically relates to the zeolite SSZ-13 having the CHA-framework structure.

Despite the wide variety of available zeolitic materials both in view of the large number of different types of microporous framework structures, ad well as with respect to the chemical and physical properties afforded by the numerous different zeolite compounds known with respect to each of the framework structure types, there remains on ongoing need for providing further zeolitic materials displaying yet unknown chemical and physical properties. Furthermore, in view of the little amount of control in the self-organization processes leading to microporous structure, a particular need exists for synthetic methodologies allowing for the gradual variation of the chemical and physical properties of the resulting zeolitic materials for making it possible to fine-tune the resulting product in function of the specific requirements needed for a given application.

DETAILED DESCRIPTION

It is therefore the object of the present invention to provide a zeolitic material having an MFI-type framework structure displaying unique chemical and physical properties in particular with respect to potential applications such as in the field of catalysis as well as a method for obtaining such a zeolitic material. Furthermore, it is the object of the present invention to provide an improved process for the preparation of such a unique zeolitic material having an MFI-type framework structure which allows for the fine tuning of its physical and chemical properties in order to achieve an improved versatility relative to specific requirements in given applications and in particular for providing a high variability and thus an improved optimization potential in catalytic applications and the like.

Therefore, the present invention relates to a process for the preparation of a zeolitic material comprising the steps of:
(1) providing a mixture comprising one or more sources for $YO_2$ and one or more alkenyltrialkylammonium cation $R^1R^2R^3R^4N^+$-containing compounds as structure directing agent; and
(2) crystallizing the mixture obtained in step (1) to obtain a zeolitic material;
wherein Y is a tetravalent element, and
wherein $R^1$, $R^2$, and $R^3$ independently from one another stand for alkyl; and $R^4$ stands for alkenyl.

Thus, it has surprisingly been found that by using an alkenyltrialkylammonium cation as the structure directing agent in a process for the preparation of a zeolitic material, wherein the alkenyltrialkylammonium cation contains an alkenyl moiety, a zeolitic material displaying unique physical and chemical properties may be obtained in particular with respect to the hydrophobic/hydrophilic properties of the resulting material, in particular compared to materials obtained with alkenyltrialkylammonium cations which exclusively contain alkyl moieties as shown, for example, in the experimental section of the present application. Said unique properties are also responsible for other unique physical and chemical properties of the materials obtained according to the inventive process, which may in particular be observed by the improved catalytic properties of the materials obtained by the inventive process as, for example, shown in the experimental section of the present application as well.

Therefore, the present invention also relates to the use of an alkenyltrialkylammonium cation $R^1R^2R^3R^4N^+$-containing compound as structure directing agent in the synthesis of microporous materials, and preferably in the synthesis of zeolitic materials. According to preferred embodiments of the inventive use, the alkenyltrialkylammonium cation $R^1R^2R^3R^4N^+$-containing compound is one or more alkenyltrialkylammonium cation $R^1R^2R^3R^4N^+$-containing compounds as used in step (1) of the inventive process and accordingly preferably as defined according to any of the particular and preferred embodiments of the present application with respect to the particular and preferred one or more alkenyltrialkylammonium cation $R^1R^2R^3R^4N^+$-containing compounds used in the inventive process.

According to the invention process, one or more sources for $YO_2$ are provided in step (1), wherein said one or more sources may be provided in any conceivable form provided that a zeolitic material comprising $YO_2$ can be crystallized in step (2). Preferably, $YO_2$ is provided as such and/or has a compound which comprises $YO_2$ as a chemical moiety and/or as a compound which (partly or entirely) is chemically transformed to $YO_2$ during the inventive process.

As regards $YO_2$ and/or precursors thereof employed in the inventive process, there is no particular restriction as to the one or more elements for which Y stands, provided that said element is a tetravalent element and that it is comprised in the zeolitic material crystallized in step (2). In particular, within the meaning of the present invention, $YO_2$ is at least partially and preferably entirely comprised in the framework structure of the zeolitic material as structure building element, as opposed to non-framework elements which can be present in the pores and cavities formed by the framework structure and typical for zeolitic materials in general. Thus, taking into account the aforementioned, Y may stand for any conceivable tetravalent element, Y standing either for a single or several tetravalent elements. Preferred tetravalent elements according to the present invention include Si, Sn, Ti, Zr, Ge, as well as combinations of any two or more thereof. According to preferred embodiments of the present invention, Y stands for Si and/or Sn, wherein according to particularly preferred embodiments of the present invention, Y comprises Si and even more preferably Y is Si.

In preferred embodiments of the present invention, wherein Y stands for Si or for a combination of Si with one or more further tetravalent elements, the source for $SiO_2$ preferably provided in step (1) can also be any conceivable source. Thus, by way of example, any type of silicas and/or silicates and/or silica derivatives may be used, wherein preferably the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, or mixtures of any two or more of the afore-mentioned compounds may equally be used. According to particularly preferred embodiments, the one or more sources for $YO_2$ used in step (1) of the inventive process are selected from the group consisting of fumed silica, silica hydrosols, reactive amorphous solid silicas, silica gel, colloidal silica, pyrogenic silica, tetraalkoxysilanes, including mixtures of any two or more thereof. According to said particularly preferred embodiments, it is further preferred that the one or more sources for $YO_2$ are selected from the group consisting of fumed silica, reactive amorphous solid silicas, silica gel, pyrogenic silica, $(C_1-C_3)$ tetraalkoxysilanes, and mixtures of any two or more thereof, wherein more preferably the one or more sources for $YO_2$ are selected from the group consisting of fumed silica, $(C_1-C_2)$tetraalkoxy-silanes, as well as mixtures of two or more thereof, wherein even more preferably according to the inventive process, the one or more sources for $YO_2$ comprises fumed silica and/or tetraethoxysilane.

Regarding the one or more alkenyltrialkylammonium cations, $R^1R^2R^3R^4N^+$ further provided in the mixture according to step (1) of the inventive process, there is no particular restriction as to the type and/or amount thereof provided that $R^1$, $R^2$, and $R^3$ stand for alkyl and $R^4$ stands for an alkenyl moiety, provided that the type and/or amount thereof which is provided in step (1) allows for the crystallization of a zeolitic material in step (2). Thus, regarding the alkyl moieties $R^1$, $R^2$, and $R^3$ of the one or more alkenyltrialkylammonium cations $R^1R^2R^3R^4N^+$ provided in step (1) of the inventive process, these may, by way of example, independently from one another stand for $(C_1-C_6)$alkyl. According to the present invention, $R^1$, $R^2$, and $R^3$ may be the same, or two of $R^1$, $R^2$, and $R^3$ may be the same and one different from the others, or $R^1$, $R^2$, and $R^3$ may each be different from one another, wherein it is preferred that at least two of $R^1$, $R^2$, and $R^3$ are the same alkyl moiety, and wherein even more preferably $R^1$, $R^2$, and $R^3$ are the same alkyl moiety according to particular embodiments of the present invention. As regards preferred embodiments of the present invention, $R^1$, $R^2$, and $R^3$ independently from one another stand for $(C_1-C_5)$alkyl, wherein more preferably $R^1$, $R^2$, and $R^3$ are independently from one another selected from the group consisting of $(C_1-C_4)$alkyl, more preferably $(C_2-C_4)$alkyl, more preferably $(C_2-C_3)$alkyl, wherein even more preferably $R^1$, $R^2$, and $R^3$ independently form one another stand for branched or unbranched propyl. According to particularly preferred embodiments of the present invention, at least one, preferably two, and even more preferably all of $R^1$, $R^2$, and $R^3$ stand for n-propyl.

As regards the alkenyl moiety $R^4$ of the one or more alkenyltrialkylammonium cations $R^1R^2R^3R^4N^+$ provided in step (1) of the inventive process, $R^4$ may stand for any suitable alkenyl group and is preferably an alkenyl selected from the group consisting of $(C_2-C_6)$alkenyl. More preferably, $R^4$ is selected from the group consisting of $(C_2-C_5)$ alkenyl, more preferably $(C_2-C_4)$alkenyl, and more preferably $(C_2-C_3)$alkenyl. According to particularly preferred embodiments, $R^4$ stands for 2-propen-1-yl, 1-propen-1-yl, or 1-propen-2-yl, and even more preferably for 2-propen-1-yl (—$CH_2$—CH=$CH_2$) or 1-propen-1-yl (—CH=$CH_2$—$CH_3$).

Therefore, embodiments of the present invention are preferred wherein $R^1$, $R^2$, and $R^3$ independently from one another stand for $(C_1-C_6)$alkyl, preferably for $(C_1-C_5)$alkyl, more preferably for $(C_1-C_4)$alkyl, more preferably for $(C_2-C_4)$alkyl, more preferably for $(C_2-C_3)$alkyl, more preferably for branched or unbranched propyl, and even more preferably for n-propyl, and
wherein $R^4$ stands for $(C_2-C_6)$alkenyl, preferably for $(C_2-C_5)$alkenyl, more preferably for $(C_2-C_4)$alkenyl, more preferably for $(C_2-C_3)$alkenyl, more preferably for 2-propen-1-yl, 1-propen-1-yl, or 1-propen-2-yl, more preferably 2-propen-1-yl or 1-propen-1-yl.

According to the present invention, there is no particular restriction as to the type of one or more alkenyltrialkylammonium cations $R^1R^2R^3R^4N^+$-containing compounds which may be provided in step (1) of the inventive process provided that the one or more alkenyltrialkylammonium cations $R^1R^2R^3R^4N^+$ contained therein may act as structure directing agent upon crystallization of the reaction mixture in step (2) of the inventive process. According to preferred embodiments, the one or more alkenyltrialkylammonium cations $R^1R^2R^3R^4N^+$-containing compounds contain one or more salts. In principle, according to said preferred embodiments, there is no particular restriction as to the counter ion to the one or more alkenyltrialkylammonium cations $R^1R^2R^3R^4N^+$, again provided that these allow for the crystallization of a zeolitic material in step (2) of the inventive process by the structure directing action of one or more of the aforementioned alkenyltrialkylammonium cations $R^1R^2R^3R^4N^+$. Thus, by way of example, the one or more alkenyltrialkylammonium cations $R^1R^2R^3R^4N^+$-containing compounds may comprise one or more hydroxides and/or halides, wherein preferably the one or more alkenyltrialkylammonium compounds comprise one or more hydroxide, chloride, and/or bromide salts, wherein more preferably the one or more alkenyltrialkylammonium cation containing compounds are selected from the group consisting of hydroxides, halides, and mixtures of two or more thereof, more preferably from the group consisting of hydroxide, chloride, bromide, and mixtures of two or more thereof, wherein according to particularly preferred embodiments, the one or more alkenyltrialkylammonium cations $R^1R^2R^3R^4N^+$-containing compounds are provided as their hydroxide salts in step (1) of the inventive process.

Thus, according to particularly preferred embodiments, the one or more alkenyltrialkylammonium cations $R^1R^2R^3R^4N^+$-containing compounds provided in step (1) comprise one or more compounds selected from the group consisting of N—$(C_2-C_5)$alkenyl-tri-$(C_1-C_5)$alkylammonium hydroxides, preferably from the group consisting of N—$(C_2-C_4)$alkenyl-tri-$(C_1-C_4)$alkylammonium hydroxides, more preferably from the group consisting of N—$(C_2-C_3)$alkenyl-tri-$(C_2-C_4)$alkylammonium hydroxides, more preferably from the group consisting of N-(2-propen-1-yl)-tri-n-propylammonium hydroxide, N-(1-propen-1-yl)-tri-n-propylammonium hydroxide, N-(1-propen-2-yl)-tri-n-propylammonium hydroxide, and mixtures of two or more thereof, wherein more preferably the structure directing agent comprises N-(2-propen-1-yl)-tri-n-propylammonium hydroxide and/or N-(1-propen-1-yl)-tri-n-propylammonium hydroxide.

As regards the amount in which the one or more alkenyltrialkylammonium cations $R^1R^2R^3R^4N^+$ which may be provided in the mixture in step (1) of the inventive process, again there is no particular restriction in this respect provided that a zeolitic material may be crystallized in step (2) of the inventive process. Thus, by way of example, the molar ratio of the one or more alkenyltrialkylammonium cations $R^1R^2R^3R^4N^+$:$YO_2$ provided in the mixture may range anywhere from 0.01 to 5, wherein preferably the molar ratio is comprised in the range of from 0.03 to 2, more preferably from 0.05 to 1, more preferably from 0.1 to 0.5, and even more preferably from 0.13 to 0.3. According to particularly preferred embodiments of the present invention, the molar ratio of the one or more alkenyltrialkylammonium cations $R^1R^2R^3R^4N^+$:$YO_2$ provided in the mixture according to step (1) is comprised in the range of from 0.15 to 0.2.

As noted in the foregoing, there is o particular restriction as to the one or more alkenyltrialkylammonium cations $R^1R^2R^3R^4N^+$ provided in step (1) as structure directing agent such that in principle a single type of alkenyltrialkylammonium cation or mixtures of two or more different types of alkenyltrialkylammonium cations may be provided in step (1) of the inventive process. According to preferred embodiments of the present invention, two or more $R^1R^2R^3R^4N^+$-containing compounds are provided in step (1). In principle, according to said preferred embodiments containing two or more different alkenyltrialkylammonium cations, there is in principle no particular restriction as to the particular differences by which the alkenyltrialkylammonium cations differ from one another. Thus, by way of example, the two or more alkenyltrialkylammonium cations may differ in view of one or more of the alkyl groups $R^1$, $R^2$, and $R^3$ contained therein and/or in view of the alkenyl group $R^4$ group contained therein, wherein according to particularly preferred embodiments, the two or more different types of alkenyltrialkylammonium cations contain the same $R^1$, $R^2$, and $R^3$ alkyl moieties yet differ in view of the $R^4$ alkenyl moieties contained therein. According to said preferred and particularly preferred embodiments wherein two or more different types of alkenyltrialkylammonium cations are provided in step (1) of the inventive process, the two or more different $R^4$ alkenyl moieties are not particularly restricted such that any conceivable difference between two or more of the $R^4$ moieties are comprised by the present invention, wherein preferably the different $R^4$ alkenyl moieties of the two or more compounds are selected from the group consisting of $(C_2-C_6)$alkenyl, preferably of $(C_2-C_5)$alkenyl, more preferably of $(C_2-C_4)$alkenyl, more preferably of $(C_2-C_3)$alkenyl, wherein even more preferably the different $R^4$ alkenyl moieties of the two or more compounds are selected from the group consisting of 2-propen-1-yl, 1-propen-1-yl, and 1-propen-2-yl. According to particularly preferred embodiments of the present invention, the two or more different $R^1R^2R^3R^4N^+$ cations contained in the mixture provided in step (1) of the inventive process comprise two different alkenyltrialkylammonium cations $R^1R^2R^3R^4N^+$ wherein $R^4$ of the first compound is 2-propen-1-yl and $R^4$ of the second compound is 1-propen-1-yl, wherein even more preferably $R^1$, $R^2$, and $R^3$ of said two compounds are identical.

Therefore, embodiments of the present invention are preferred wherein the mixture provided in step (1) comprises two or more $R^1R^2R^3R^4N^+$-containing compounds, wherein $R^4$ of the two or more compounds are different from one another and stand for $(C_2-C_6)$alkenyl, preferably for $(C_2-C_5)$alkenyl, more preferably for $(C_2-C_4)$alkenyl, more preferably for $(C_2-C_3)$alkenyl, more preferably for 2-propen-1-yl, 1-propen-1-yl, or 1-propen-2-yl, and even more preferably for 2-propen-1-yl and 1-propen-1-yl.

According to the particularly preferred embodiments of the present invention wherein the mixture provided in step (1) comprises two $R^1R^2R^3R^4N^+$-containing compounds differing in their $R^4$ alkenyl moiety and preferably only differing therein, there is again no particular restriction as to the manner in which said moieties differ from one another. Thus, by way of example, the different $R^4$ alkenyl moieties may differ in view of the length of the alkenyl chain and/or the number and/or position of the one or more C=C double bonds respectively contained therein wherein preferably the different $R^4$ alkenyl moieties only contain one double bond, respectively, such that they may accordingly differ e.g. in chain length and/or in the position of the double bond on the respective chains, wherein even more preferably the different $R^4$ moieties have the same chain length such that they differ in the position of the double bond in their respective chain. Thus, according to said particularly preferred embodiments, the $R^4$ alkenyl moieties having the same chain length may differ from one another in that $R^4$ of the first compound has the C=C double bond at the end of its chain whereas $R^4$ of the second compound has its C=C double bond not located at the end of its chain, or, the $R^4$ alkenyl moieties of the first and second compounds may both contain the C=C double bond not at the end of their respective chains yet at different positions of their chains, i.e. with respect to their distance from the nitrogen atom bound to the chain.

According to said particularly preferred embodiments, it is, however, preferred that of the two different $R^1R^2R^3R^4N^+$-containing compounds, the first compound contains an end-chain —CH=$CH_2$ moiety, whereas $R^4$ of the second compound contains an end-chain moiety —$CH_3$.

Furthermore, according to said particularly preferred embodiments of the present invention wherein the mixture provided in step (1) comprises two $R^1R^2R^3R^4N^+$-containing compounds, wherein $R^4$ of the first compound (A) contains an end-chain —CH=$CH_2$ alkene moiety, and $R^4$ of the second compound (B) contains an end-chain moiety —$CH_3$, as for any of the embodiments according to the present invention wherein two or more $R^1R^2R^3R^4N^+$-containing compounds are provided in step (1), there is no particular restriction as to the relative amounts in which the individual types of $R^1R^2R^3R^4N^+$-containing compounds are employed with respect to one another. Thus, as regards the molar ratio of two or more different $R^1R^2R^3R^4N^+$-containing compounds and in particular of two different $R^1R^2R^3R^4N^+$ cations provided in the mixture of step (1) of the inventive process according to the aforementioned particular and preferred embodiments, said ratio may adopt any conceivable value provided that a zeolitic material may be crystallized in step (2) of the inventive process. It is, however, preferred according to the present invention that according to preferred embodiments wherein the mixture provided in step (1) comprises two $R^1R^2R^3R^4N^+$-containing compounds wherein $R^4$ of the first compound (A) contains an end-chain —CH=$CH_2$ alkene moiety, and $R^4$ of the second compound (B) contains an end-chain moiety —$CH_3$, although in principle any suitable molar ratio of said two compounds (A) and (B) may be employed in the inventive process, it is preferred that the A:B ratio in the mixture provided in step (1) is comprised in the range of from 25:75 to 99:1, more preferably of from 50:50 to 98:2, more preferably of from 75:25 to 97:3, and even more preferably of from 85:15 to 96:4. According to particularly preferred embodiments thereof, the A:B molar ratio of the two $R^1R^2R^3R^4N^+$-containing compounds provided in step (1) is comprised in the range of from 90:10 to 95:5.

Therefore, embodiments of the present invention wherein the mixture provided in step (1) comprises two $R^1R^2R^3R^4N^+$-containing compounds are further preferred, wherein $R^4$ of the first compound (A) contains an end-chain —CH=$CH_2$ moiety, and $R^4$ of the second compound (B) contains an end-chain moiety —$CH_3$, and wherein the molar ratio A:B in the mixture provided in step (1) is preferably comprised in the range of from 25:75 to 99:1, more preferably of from 50:50 to 98:2, more preferably of from 75:25 to 97:3, more preferably of from 85:15 to 96:4, and even more preferably of from 90:10 to 95:5

According to alternative embodiments of the present invention which are preferred, the A:B ratio of the aforemention preferred mixture of the $R^1R^2R^3R^4N^+$-containing compounds (A) and (B) in the mixture provided in step (1) is comprised in the range of from 85:15 to 99:1, more preferably of from 90:10 to 98:2, more preferably of from 92:8 to 97:3, and even more preferably of from 94:6 to 96:4.

Thus, as shown in the experimental section of the present application, in addition to the surprising technical effect of the present invention linked to the use of the inventive $R^1R^2R^3R^4N^+$-containing compounds for obtaining a unique zeolitic material, it has furthermore quite unexpectedly been found that in embodiments comprising two or more different $R^1R^2R^3R^4N^+$-containing compounds according to the aforementioned particularly preferred embodiments, by varying the relative content of the different $R^1R^2R^3R^4N^+$ cations in step (1) of the inventive process, the specific properties and in particular the unique hydrophobic properties of the zeolitic materials may be varied in a controlled manner. As a result, according to said particularly preferred embodiments of the present invention, a highly versatile process for the preparation of a unique zeolitic material is provided which allows for the specific fine tuning of the physical and chemical properties thereof for a given application thus allowing a high degree of optimization. This not only constitutes a highly efficient method for providing a unique zeolitic material which is perfectly tailored with respect to a given application which depends on the physical properties of the materials such as e.g. in applications involving the adsorption and/or separation of chemical compounds with the aid of a zeolitic material, but even more may allow for a considerable degree of optimization potential in catalytic applications wherein the unique zeolitic material may act as catalyst and/or catalyst support material.

In this respect, according to highly preferred embodiments of the present invention, the first and second compounds (A) and (B) are constitutional isomers with respect to the position of the double bond in $R^4$, said constitutional isomers particularly preferably being N-(2-propen-1-yl)-tri-n-propylammonium hydroxide and N-(1-propen-1-yl)-tri-n-propylammonium hydroxide.

According to the present invention it is preferred that the mixture provided in step (1) further comprises one or more sources for $X_2O_3$, wherein X is a trivalent element. In particular, as demonstrated in the experimental section of the present application, in addition to the aforementioned unique physical and chemical properties of the zeolitic material which may be obtained according to the inventive process, it has furthermore surprisingly been found that according to embodiments of the inventive process wherein one or more sources for $X_2O_3$ are further provided in step (1), the additional properties provided to the zeolitic material by the incorporation of $X_2O_3$ therein in particular as a framework element of the zeolitic material may be clearly distinguished from the properties provided to a zeolitic material by the incorporation of the same trivalent element X in a procedure employing an alkenyltrialkylammonium cation exclusively containing alkyl moieties instead of the inventive alkenyltrialkylammonium cation $R^1R^2R^3R^4N^+$. In particular, as will be shown below, it has quite unexpectedly been found that according to the inventive process the use of one or more sources for $X_2O_3$ leads to a zeolitic material of which the sites for X in the framework structure display clearly different properties in particular with respect to their acidity. As a result, the inventive process unexpectedly affords a unique zeolitic material in particular with respect to the physical and/or chemical properties thereof wherein this also applies to the trivalent element X incorporated into the zeolitic framework according to said preferred embodiments. Thus, a zeolitic material comprising $YO_2$ and $X_2O_3$ as framework elements may be provided according to the inventive process displaying unique physical and/or chemical properties which may be advantageously used in known and future application and in particular in catalytic applications wherein the X-sites of the framework structure display catalytic and/or co-catalytic activities as catalyst and/or catalyst support material.

As regards the elements which may be employed as the trivalent element X comprised in the one or more sources for $X_2O_3$ provided in step (1), there is no particular restriction according to the present invention as to which elements or element mixtures may be employed, provided that a zeolitic material is crystallized in step (2) and preferably wherein a zeolitic material comprising $YO_2$ and $X_2O_3$ as framework elements may be obtained in said step of crystallization. According to preferred embodiments of the present invention, X is selected from the group consisting of Al, B, In, Ga, and mixtures of two or more thereof, wherein preferably X is Al and/or B. According to particularly preferred embodiments of the present invention, X comprises Al, wherein even more preferably X is Al.

According to alternatively preferred embodiments of the present invention, however, the mixture provided in step (1) of the inventive process contains substantially no source for $X_2O_3$, wherein preferably X is a trivalent element according to any of the particular and/or preferred embodiments defined in the present application. Thus, according to said alternatively preferred embodiments of the present invention, the mixture provided in step (1) contains substantially no source for $X_2O_3$ wherein in principle X may stand for one or more of any trivalent element which when present in the mixture of step (1) is incorporated into the framework structure of the zeolitic material upon crystallization in step (2), wherein preferably X is Al, and wherein more preferably X is Al and/or B, and wherein even more preferably X is one or more elements selected from the group consisting of Al, B, In, and Ga. According to particularly preferred embodiments, however, the mixture provided in step (1) of the inventive process comprises substantially no source for $X_2O_3$ wherein X is any trivalent element which is capable of being incorporated into the zeolitic framework structure in the crystallization step (2) of the inventive process.

Within the meaning of the present invention, the term "substantially" as employed in the present application with respect to the amount of a source of $X_2O_3$ contained in the mixture provided in step (1) indicates an amount of 0.1 wt.-% or less of the total amount of any one or more sources for $X_2O_3$, preferably 0.05 wt.-% or less, more preferably 0.001 wt.-% or less, more preferably 0.0005 wt.-% or less, and even more preferably 0.0001 wt.-% or less thereof.

According to embodiments of the present invention wherein the mixture in step (1) comprises one or more sources for $X_2O_3$ it is preferred in instances wherein one or more sources of $Al_2O_3$ is contained in the mixture that said one or more sources comprises one or more compounds selected from aluminum, aluminum alkoxides, alumina, and aluminates, more preferably one or more aluminates, wherein one or more aluminates are preferably one or more aluminate salts selected from the group consisting of alkali metal aluminates, aluminum hydroxide, and mixtures of two or more thereof. According to particularly preferred embodiments thereof, the one or more sources for $X_2O_3$ comprise aluminum hydroxide and/or one or more alkali metal aluminates, the alkali metal preferably being sodium and/or potassium, and more preferably being sodium. Alternatively, according to embodiments wherein the one or more sources for $X_2O_3$ comprise aluminum, it is preferred that said one or more sources comprise aluminum powder. Furthermore, according to embodiments wherein the one or more sources for $X_2O_3$ comprise one or more aluminum alkoxides, there is no particular restriction as to the alkoxide substituents contained therein, provided that a zeolitic material may be crystallized in step (2) of the inventive process. Thus, by way of example, one or more aluminum alkoxides may be employed selected from the group consisting of $(C_1-C_5)$ alkoxides, preferably $(C_1-C_4)$alkoxides, more preferably $(C_2-C_3)$alkoxides, and even more preferably branched $C_3$-alkoxides, wherein even more preferably the one or more sources for $X_2O_3$ comprises aluminum triisopropylate.

According to the alternatively preferred embodiments of the present invention wherein the mixture provided in step (1) of the inventive process contains substantially no source for $Al_2O_3$, it is accordingly preferred that the mixture provided in step (1) comprises no substantial amount of any one of the aforementioned particular and preferred sources for $Al_2O_3$ selected among alumina and/or aluminates.

As regards embodiments of the present invention wherein one or more sources for $X_2O_3$ are provided in step (1), no particular restriction applies according to the present invention neither regarding the type of the one or more sources for $X_2O_3$, nor with respect to amounts in which they are used. Thus, by way of example, relative to the amount of the one or more sources for $YO_2$ provided in the mixture of step (1), the $YO_2:X_2O_3$ molar ratio of the mixture may range anywhere from 0.5 to 500, wherein preferably molar ratios are provided comprised in the range of from 1 to 400, more preferably from 5 to 300, more preferably from 20 to 200, more preferably from 30 to 150, and even more preferably of from 35 to 120. According to particularly preferred embodiments, the $YO_2:X_2O_3$ molar ratio of the mixture provided in step (1) is comprised in the range of from 40 to 100.

According to the process of the present invention, seed crystals may optionally be provided in step (1), wherein said seed crystals preferably comprise a zeolitic material of the same type of framework structure as obtained from crystallization in step (2), wherein more preferably the seed crystals comprise a zeolitic material as obtained according to the inventive process. According to particularly preferred embodiments, the seed crystals comprise one or more zeolitic materials having an MFI-type framework structure. According to said preferred embodiments, the seed crystals may comprise any zeolitic material having an MFI-type framework structure, provided that a zeolitic material is crystallized in step (2), which is preferably a zeolitic material having the MFI-type framework structure, wherein more preferably the zeolitic material having an MFI-type framework structure comprised in the seed crystals is a zeolitic material obtained according to the inventive process, and wherein even more preferably the zeolitic material having an MFI-type framework structure comprised in the seed crystals is the same as the zeolitic material having an MFI-type framework structure which is then crystallized in step (2). Particularly preferred according to the present invention are seed crystals comprising one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, wherein more preferably the seed crystals comprise ZSM-5, Silicalite, TS-1, or mixtures of two or more thereof, and wherein even more preferably the seed crystals comprise ZSM-5 and/or TS-1. According to an even more preferred embodiments the seed crystals comprise one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, and more preferably one or more zeolites selected from the group consisting of ZSM-5, Silicalite, TS-1, or mixtures of two or more thereof, wherein said one or more zeolites have been obtained according to the inventive process, wherein even more preferably ZSM-5 and/or TS-1 obtained according to the inventive process is comprised in the seed crystals.

According to the inventive process, any suitable amount of seed crystals can be provided in the mixture according to step (1), provided that a zeolitic material is crystallized in step (2). In general, the amount of seed crystals contained in the mixture according to step (1) ranges from 0.01 to 30 wt.-% based on 100 wt.-% of $YO_2$ in the at least one source for $YO_2$, preferably from 0.1 to 20 wt.-%, more preferably from 0.5 to 10 wt.-%, more preferably from 2 to 8 wt.-%, and even more preferably from 4 to 6 wt.-%

In step (1) according to the present invention, the mixture can be prepared by any conceivable means, wherein mixing by agitation is preferred, preferably by means of stirring.

In preferred embodiments of the inventive process, the mixture provided in step (1) further comprises one or more solvents. According to the inventive process, there is no particular restriction whatsoever neither with respect to the type and/or number of the one or more solvents, nor with respect to the amount in which they may be used in the inventive process provided that a zeolitic material my be crystallized in step (2). According to the inventive process it is however preferred that the one or more solvents comprise water, and more preferably distilled water, wherein according to particularly preferred embodiments distilled water is used as the only solvent in the mixture provided in step (1).

As noted above, in preferred embodiments of the inventive process wherein one or more solvents are employed, there is no particular restriction as to the amount in which they may be used, wherein in particularly preferred embodiments employing water and more preferably distilled water, the $H_2O:YO_2$ molar ratio of the mixture may range by way of example anywhere from 3 to 100, wherein preferably the molar ratio employed is comprised in the range of from 5 to 50, more preferably of from 6 to 30, more preferably of from 7 to 20, and even more preferably of from 8 to 15. According to particularly preferred embodiments of the present invention wherein water and preferably distilled water is comprised among the one or more solvents provided in step (1) and even more preferably is the sole solvent used in the reaction mixture crystallized in step (2), the $H_2O:YO_2$ molar ratio is comprised in the range of from 9 to 12.

The present invention further comprises preferred embodiments of the inventive process wherein one or more sources of one or more elements suitable for isomorphous substitution of at least a portion of the Y atoms and/or of the X atoms in the zeolite framework structure is added to the mixture according to step (1). In this respect, there is no particular restriction according to the present invention neither as to the type and/or number nor as to the amount of which said one or more sources of one or more elements suitable for isomorphous substitution may be employed. Thus, in principle, any one or more elements suitable for isomorphous substitution may be employed provided that they are at least partly incorporated into the framework structure of the zeolitic material crystallized in step (2) of the inventive process. According to preferred embodiments, the one or more elements are selected from the group consisting of B, Fe, Ti, Sn, Ga, Ge, Zr, V, Nb, Cu, Zn, Li, Be, and mixtures of two or more thereof, wherein more preferably the one or more elements are selected from the group consisting of B, Fe, Ti, Sn, Zr, Cu, and mixtures of two or more thereof. According to particularly preferred embodiments of the present invention, the one or more elements suitable for isomorphous substitution provided in step (1) comprise Ti and/or B, preferably Ti, wherein even more preferably the one or more elements are Ti and/or B. According to embodiments of the present invention which are particularly preferred, Ti is added as the element suitable for isomorphous substitution of at least a portion of the Y and/or of the X atoms in the mixture according to step (1).

According to the preferred embodiment of the present invention including one or more elements suitable for isomorphous substitution in the mixture of step (1) of the inventive process, it is further preferred that no substantial amount of a source for $Al_2O_3$ is further provided in the mixture of step (1) when said one or more elements suitable for isomorphous substitution is employed, and wherein even more preferably no source for $X_2O_3$ wherein X is a trivalent element other than the one or more elements suitable for isomorphous substitution is provided in the mixture, wherein in particular X is one or more of a Al, B, In, Ga, and mixtures of two or more thereof, and more specifically Al and/or B.

As regards preferred embodiments of the inventive process wherein the one or more sources for isomorphous substitution include Ti, there is in principle no particular restriction neither regarding the type and/or amount of the one or more sources for Ti neither with respect to the amount in which they may be used, wherein it is preferred that one or more titania precursor compounds are employed among the one or more sources for Ti. More preferably, the one or more titania precursor compounds are selected from the group consisting of titanic acids, titanic acid esters, and mixtures of two or more thereof, wherein more preferably the one or more sources for isomorphous substitution comprises one or more titanic acid esters, and even more preferably one or more tetraalkoxytitanates. Among the tetraalkoxytitanates which may be employed, it is preferred that these are selected from $(C_1-C_3)$tetraalkoxytitanates, more preferably from $(C_1-C_2)$tetraalkoxytitanates, wherein according to particularly preferred embodiments the one or more sources for isomorphous substitution comprises tetraethoxytitanate. According to particularly preferred embodiments of the present invention, tetraethoxytitanate is used as the single source for Ti as the element suitable for isomorphous substitution in step (1) of the inventive process.

As noted above, no particular restriction applies with respect to the amount of the one or more sources for isomorphous substitution preferably provided in the mixture in step (1) of the inventive process. Thus, by way of example, the molar ratio of $YO_2$ to the one or more elements suitable for isomorphous substitution in the mixture of step (1) of the inventive process may be comprised in the range of anywhere from 1 to 300, wherein it is preferred that said ratio is comprised in the range of from 5 to 150, more preferably of from 10 to 100, more preferably of from 20 to 70, and even preferably of from 25 to 50. According to particularly preferred embodiments of the present invention wherein one or more elements suitable for isomorphous substitution are included in the mixture of step (1), it is preferred that the molar ratio of $YO_2$ to said one or more elements is comprised in the range of from 30 to 40.

As regards the crystallization performed in step (2) of the inventive process, no particular restriction applies according to the present invention as to the actual means employed for allowing for the crystallization of a zeolitic material from the mixture of step (1). Thus, any suitable means may be employed wherein it is preferred that the crystallization is achieved by heating of the mixture of step (1). According to said preferred embodiments, no particular restriction again applies with respect to the temperature at which said crystallization may be achieved, wherein it is preferred that the crystallization is conducted under heating at a temperature comprised in the range of from 90 to 210° C., more preferably of from 110 to 200° C., more preferably of from 130 to 190° C., and even more preferably of from 145 to 180° C. According to particularly preferred embodiments of the present invention, the preferred heating of the mixture provided in step (1) in step (2) for the crystallization of a zeolitic material is conducted at a temperature comprised in the range of from 155 to 170° C.

Concerning the heating preferably employed in step (2) of the inventive process as means for the crystallization of the zeolitic material, said heating may in principle be conducted under any suitable pressure provided that crystallization is achieved. In preferred embodiments of the present invention, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises water, preferably distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

Furthermore, as regards the period in which the preferred heating in step (2) of the inventive process is conducted for crystallizing the zeolitic material, there is again no particular restriction in this respect provided that the period of heating is suitable for achieving crystallization. Thus, by way of example, the period of heating may range anywhere from 5 to 120 h, wherein preferably heating is conducted from 8 to 80 h, more preferably from 10 to 50 h, and even more preferably from 13 to 35 h. According to particularly preferred embodiments heating in step (2) of the inventive process is conducted for a period of from 15 to 25 h.

According to preferred embodiments of the present invention, wherein the mixture is heated in step (2), said heating may be conducted during the entire crystallization process or during only one or more portions thereof, provided that a zeolitic material is crystallized. Preferably, heating is conducted during the entire duration of crystallization.

Further regarding the means of crystallization in step (2) of the inventive process, it is principally possible according to the present invention to perform said crystallization either under static conditions or by means of agitating the mixture. According to embodiments involving the agitation of the mixture, there is no particular restriction as to the means by which said agitation may be performed such that any one of vibrational means, rotation of the reaction vessel, and/or mechanical stirring of the reaction mixture may be employed to this effect wherein according to said embodiments it is preferred that agitation is achieved by stirring of the reaction mixture. According to alternatively preferred embodiments, however, crystallization is performed under static conditions, i.e. in the absence of any particular means of agitation during the crystallization process.

In general, the process of the present invention can optionally comprise further steps for the work-up and/or further physical and/or chemical transformation of the zeolitic material crystallized in step (2) from the mixture provided in step (1). The crystallized material can for example be subject to any sequence of isolation and/or washing procedures, wherein the zeolitic material obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultra-filtration, diafiltration, centrifugation and/or decantation methods, wherein filtration methods can involve suction and/or pressure filtration steps. According to preferred embodiments, and in particular according to the particular and preferred embodiments of the present invention wherein one or more elements suitable for isomorphous substitution have been employed, it is preferred that the reaction mixture is adjusted to a pH comprised in the range of from 6 to 8, preferably from 6.5 to 7.5, and even more preferably of from 7 to 7.4 prior to isolation. Within the meaning of the present invention, pH values preferably refer to those values as determined via a standard glass electrode.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5.

Furthermore, the inventive process can optionally comprise one or more drying steps. In general, any conceivable means of drying can be used. Drying procedures preferably include heating and/or applying vacuum to the zeolitic material. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, more preferably of from 12 to 36 h, and even more preferably of from 18 to 30 h.

In general, the optional washing and/or isolation and/or ion-exchange procedures comprised in the inventive process can be conducted in any conceivable order and repeated as often as desired.

Therefore, according to preferred embodiments of the present invention, the process for the preparation of a zeolitic material further comprises one or more of the following steps of
(3) isolating the zeolitic material, preferably by filtration, and/or
(4) washing the zeolitic material, and/or
(5) drying the zeolitic material, and/or
(6) subjecting the zeolitic material to an ion-exchange procedure,
wherein the steps (3) and/or (4) and/or (5) and/or (6) can be conducted in any order, and
wherein one or more of said steps is preferably repeated one or more times.

Thus, according to the inventive process, the zeolitic material crystallized in step (2) can optionally be subject to at least one step of an ion-exchange procedure, wherein the term "ion-exchange" according to the present invention generally refers to non-framework ionic elements and/or molecules contained in the zeolitic material which are accordingly exchanged by other ions, which are generally provided from an external source.

In general, any conceivable ion-exchange procedure with all possible ionic elements and/or molecules can be conducted on the zeolitic material. Preferably, as ionic elements at least one cation and/or cationic element is employed which is preferably selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof. According to particularly preferred embodiments of the present invention, the one or more cations and/or cationic elements are selected from the group consisting of Mg, Mo, Fe, Ni, Cu, Zn, Ag, and mixtures of two or more thereof. Preferably, the zeolitic material is first ion-exchanged with $H^+$ and/or $NH_4^+$, and more preferably with $NH_4^+$, before being subject to a further ion-exchange procedure, more preferably before being subject to ion-exchange with at least one cation and/or cationic element selected from the group consisting of Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of Mg, Sr, Cr, Mo, Fe, Co, Ni, Cu, Zn, Ag, and mixtures of two or more thereof, more preferably from the group consisting of Mg, Cr, Mo, Fe, Ni, Cu, Zn, Ag, and mixtures of two or more thereof, wherein even more preferably the at least one cation and/or cationic element is selected from the group consisting of Mg, Mo, Fe, Ni, Cu, Zn, Ag, and mixtures of two or more thereof. As regards preferred embodiments of the present invention wherein the zeolitic material is first ion-exchanged with an $NH_4^+$ before being subject to a further ion-exchange procedure, this may also be achieved by transformation of $H^+$ ions already contained in the zeolitic material into $NH_4^+$ ions by appropriate treatment with ammonia or any precursor compound thereof. As regards the one or more ionic non-framework elements which are ion-exchanged, there is no particular restriction according to the present invention as to which ionic non-framework elements present in the zeolitic material may be ion-exchanged according to the aforementioned preferred embodiments, wherein preferably the one or more ionic non-framework elements to be exchanged comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, and even more preferably Na.

According to a further embodiment of the inventive process, the zeolitic material crystallized in step (2) is directly subject to at least one step of drying, preferably to spray drying and or spray granulation, without isolating, washing, or drying of the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein not only removal of organotemplate compounds is avoided, but also the number of post-synthesis workup steps is minimized, as a result of which the zeolitic material can be obtained from a highly simplified process.

According to a further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step.

In general, the zeolitic material obtained according to the inventive process may be any conceivable zeolitic material, wherein preferably said zeolitic material formed in step (2) comprises one or more zeolites having the MFI-type framework structure. Among the preferred zeolitic materials comprising one or more zeolites having the MFI-type framework structure, there is no particular restriction neither with respect to the type and/or number thereof, nor with respect to the amount thereof in the zeolitic material. According to preferred embodiments of the present invention, the one or more zeolites having the MFI framework structure comprise one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, wherein more preferably the zeolitic material comprises ZSM-5, Silicalite, TS-1, or mixtures of two or more thereof, wherein even more preferably the zeolitic material formed in step (2) comprises ZSM-5 and/or TS-1.

The present invention further relates to a zeolitic material having an MFI-type framework structure which is either obtained by the process according to the present invention or by any conceivable process which leads to a zeolitic material having an MFI-type framework structure as obtainable according to the inventive process, wherein in particular the inventive process designates any of the particular and preferred embodiments thereof as defined in the present application.

Furthermore, the present invention also relates to a zeolitic material having an MFI-type framework structure comprising $YO_2$ and optionally comprising $X_2O_3$, wherein Y is a tetravalent element and X is a trivalent element, said material having an X-ray diffraction pattern comprising at least the following reflections:

| Intensity (%) | Diffraction angle 2θ/° [Cu K(alpha 1)] |
|---|---|
| 15-55 | 7.88-8.16 |
| 11-35 | 8.83-9.13 |
| 100 | 23.04-23.46 |
| 27-40 | 23.68-23.89 |
| 21-66 | 23.90-24.23 |
| 22-44 | 24.29-24.71 | wherein 100% relates to the intensity of the maximum peak in the X-ray powder diffraction pattern. According to preferred embodiments of the present invention, the zeolitic material displaying the aforementioned X-ray diffraction pattern comprises ZSM-5, wherein it is even more preferred that the zeolitic material is ZSM-5.

As regards the intensity of the first reflection comprised in the range of 7.88°-8.16° 2θ, it is preferred according to the present invention that the intensity of said reflection is comprised in the range of from 15-45, more preferably of from 16-30, and even more preferably of from 17-23. Furthermore or in addition thereto, and preferably in addition thereto, as regards the intensity of the second reflection comprised in the range of 8.83°-9.13° 2θ, it is preferred according to the present invention that the intensity of said reflection is comprised in the range of from 12-30, more preferably of from 13-25, more preferably of from 14-23, and even more preferably of from 15-21.

According to preferred embodiments of the present invention, the synthetic zeolitic material having an MFI-type framework structure has an X-ray diffraction pattern comprising at least the following reflections:

| Intensity (%) | Diffraction angle 2θ/° [Cu K(alpha 1)] |
|---|---|
| 17-45 | 7.95-8.09 |
| 15-25 | 8.91-9.05 |
| 100 | 23.14-23.35 |
| 30-36 | 23.74-23.86 |
| 33-55 | 23.95-24.14 |
| 28-38 | 24.40-24.61 | wherein again 100% relates to the intensity of the maximum peak in the X-ray powder diffraction pattern. Furthermore, according to particularly preferred embodiments, the zeolitic material having an MFI-type framework structure has an X-ray diffraction pattern comprising at least the following reflections:

| Intensity (%) | Diffraction angle 2θ/° [Cu K(alpha 1)] |
|---|---|
| 17-45 | 7.95-8.09 |
| 15-25 | 8.91-9.05 |
| 100 | 23.14-23.340 |
| 80-86 | 23.341-23.47 |
| 30-36 | 23.74-23.86 |
| 33-55 | 23.95-24.14 |
| 28-38 | 24.40-24.61 |

According to said preferred embodiments, as regards the intensity of the first reflection comprised in the range of 7.95°-8.09° 2θ, it is preferred according to the present invention that the intensity of said reflection is comprised in the range of from 17-30, more preferably of from 17-25, and even more preferably of from 17-23. Furthermore or in addition thereto, and preferably in addition thereto, as regards the intensity of the second reflection comprised in the range of 8.91°-9.05° 2θ, it is preferred according to the present invention that the intensity of said reflection is comprised in the range of from 15-24, more preferably of from 14-22, and even more preferably of from 15-21.

As regards the $^{29}$Si MAS NMR of the inventive zeolitic material according to embodiments wherein Y includes Si or is preferably Si, there is no particular restriction as to the number and/or respective ppm values and/or relative intensities of the signals displayed in the NMR spectrum. According to preferred embodiments of the present invention, the $^{29}$Si MAS NMR comprises
a first peak (P1) comprised in the range of from −110.4 to −114.0 ppm and
a second peak (P2) comprised in the range of from −101.4 to −106.8 ppm,
wherein more preferably the first peak is comprised in the range of from −110.8 to −113.4 ppm and the second peak is comprised in the range of from −101.6 to −106.5 ppm. According to particularly preferred embodiments, the first peak (P1) is comprised in the range of from −111.2 to −112.8 ppm and the second peak (P2) is comprised in the range of from −101.8 to −106.2 ppm.

According to further embodiments of the present invention which are particularly preferred, the $^{29}$Si CP MAS NMR of the zeolitic material obtained from ($^1$H-$^{29}$Si) cross polarization experiments comprises a first peak (P1) comprised in the range of from −110.80 to −111.30 ppm and a second peak (P2) comprised in the range of from −101.00 to −103.50 ppm, wherein preferably the integration of the first and second peaks in the $^{29}$Si CP-MAS NMR of the zeolitic material offers a ratio of the integration values P1:P2 of 1:(1.40-2.50). More preferably, according to said preferred embodiments, the first peak (P1) is comprised in the range of from −111.00 to −112.10 ppm and the second peak (P2) is comprised in the range of from −101.50 to −103.00 ppm wherein the integration of the first and second peaks in the $^{29}$Si CP-MAS NMR of the zeolitic material preferably offers a ratio of the integration values P1:P2 of 1:(1.45-2.20), and more preferably of 1:(1.50-2.10). More preferably, the first peak (P1) is comprised in the range of from −111.20 to −111.95 ppm and the second peak (P2) is comprised in the range of −101.70 to −102.60 ppm, wherein the integration of the first and second peaks offers a ratio of the integration values P1:P2 of 1:(1.55-2.00), and more preferably of 1:(1.60-1.95). According to particularly preferred embodiments, the first peak (P1) is comprised in the range of from −111.30 to −111.85 ppm and the second peak (P2) is comprised in the range of from −101.95 to −102.40 ppm, wherein the integration of the first and second peaks in the $^{29}$Si CP-MAS NMR of the zeolitic material preferably offers a ratio of the integration values P1:P2 of 1:(1.65-1.90).

As regards the $^{27}$Al MAS NMR of the inventive zeolitic materials having the MFI-type framework structure comprising $X_2O_3$ wherein X includes Al or is preferably Al, there is again no particular restriction as to the number and/or respective ppm values and/or respective intensities of the signals which may be comprised in the NMR spectrum. According to preferred embodiments of the present invention, however, the $^{27}$Al MAS NMR spectrum of the inventive materials comprises a first peak (P'1) comprised in the range of from 50.00 to 53.50 ppm and a second peak (P'2) comprised in the range of from −0.50 to −2.00 ppm, wherein the integration of the first and second peaks in the $^{27}$Al MAS NMR spectrum of the zeolitic material preferably offers a ratio of the integration values P'1:P'2 of 1:(0.5-1.2). More preferably, the first peak (P'1) is comprised in the range of from 50.50 to 52.80 ppm, and the second peak (P'2) is comprised in the range of from −0.80 to −1.70 ppm, wherein the integration of the first and second peaks offers a ratio of the integration values P'1:P'2 of 1:(0.1-0.9), more preferably of 1:(0.2-0.7). More preferably, the first peak (P'1) is comprised in the range of from 50.70 to 52.50 ppm and the second peak (P'2) is comprised in the range of from −1.00 to −1.50 ppm, wherein the integration of the first and second peaks offers a ratio of the integration values P'1:P'2 of 1:(0.3-0.6), and more preferably of 1:(0.35-0.55). According to particularly preferred embodiments of the present invention, the $^{27}Al$ MAS NMR of the zeolitic material comprises a first peak (P'1) comprised in the range of from 50.85 to 52.30 ppm and a second peak (P'2) comprised in the range of from −1.10 to −1.35 ppm, wherein the integration of the first and second peaks in the $^{27}Al$ MAS NMR of the zeolitic material preferably offers a ratio of the integration values P'1:P'2 of 1:(0.4-0.5).

There is no particular restriction according to the present invention as to the standard used in the $^{29}Si$ and $^{27}Al$ MAS NMR experiments for obtaining the respective values for the chemical shift in ppm in the $^{29}Si$ and $^{27}Al$ MAS NMR spectra according to particular and preferred embodiments of the present invention, wherein preferably an external standard is used. According to particularly preferred embodiments, the external standard used in the $^{29}Si$ MAS NMR experiment is the polymer Q8M8 as an external secondary standard in the $^{29}Si$ MAS NMR experiment, wherein the resonance of the trimethylsilyl M group is set to 12.5 ppm, as well as on the use of an aqueous 1 M solution of $AlCl_3$ as an external zero reference in the $^{27}Al$ MAS NMR experiment, respectively.

Furthermore, in an alternative embodiment, the present invention also relates to a synthetic zeolitic material having an MFI-type framework structure comprising $YO_2$ and optionally comprising $X_2O_3$, wherein Y is a tetravalent element, and X is a trivalent element, said material having an X-ray diffraction pattern comprising at least the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern. According to preferred embodiments of the present invention, the alternative zeolitic material displaying the aforementioned X-ray diffraction pattern comprises TS-1, wherein it is even more preferred that the alternative zeolitic material is TS-1.

As regards the intensity of the first reflection comprised in the range of 7.66°-8.20° 2θ, it is preferred according to the present invention that the intensity of said reflection is comprised in the range of from 70-100, more preferably of from 80-100, more preferably of from 85-100, and even more preferably of from 90-100. Furthermore or in addition thereto, and preferably in addition thereto, as regards the intensity of the second reflection comprised in the range of 8.58°-9.05° 2θ, it is preferred according to the present invention that the intensity of said reflection is comprised in the range of from 43-70, more preferably of from 46-60, more preferably of from 49-57, and even more preferably of from 51-55.

According to the present invention it is preferred that said alternative zeolitic material having an MFI-type framework structure has an X-ray diffraction pattern comprising at least the following reflections:

| Intensity (%) | Diffraction angle 2θ/° [Cu K(alpha 1)] |
|---|---|
| 70-100 | 7.79-8.06 |
| 45-62 | 8.7-8.93 |
| 96-100 | 22.94-23.21 |
| 51-56 | 23.78-24.05 |
| 18-22 | 29.78-30.07 |
| 17-23 | 44.93-45.25 |
| 18-22 | 45.26-45.55 | wherein again 100% relates to the intensity of the maximum peak in the X-ray powder diffraction pattern.

According to said preferred embodiments, as regards the intensity of the first reflection comprised in the range of 7.79°-8.06° 2θ, it is preferred according to the present invention that the intensity of said reflection is comprised in the range of from 80-100, more preferably of from 85-100, and even more preferably of from 90-100. Furthermore or in addition thereto, and preferably in addition thereto, as regards the intensity of the second reflection comprised in the range of 8.7°-8.93° 2θ, it is preferred according to the present invention that the intensity of said reflection is comprised in the range of from 46-60, more preferably of from 49-57, and even more preferably of from 51-55.

As regards the $^{29}Si$ MAS NMR of the alternative zeolitic material according to the present invention, there is no particular restriction as to the number and/or respective ppm values and/or relative intensities of the signals displayed in the NMR spectrum. According to preferred embodiments of the present invention, the $^{29}Si$ MAS NMR of the alternative zeolitic material comprises a first peak (P"1) which is comprised in the range of from −110.4 to −114.0 ppm in addition to a second peak (P"2) comprised in the range of from −100.2 to −104.2 ppm. More preferably, the $^{29}Si$ MAS NMR of the alternative zeolitic material comprises a first peak (P"1) comprised in the range of from −110.8 to −113.4 ppm and a second peak (P"2) in the range of from −100.8 to −103.6 ppm. According to a particularly preferred embodiment of the present invention, the $^{29}Si$ MAS NMR of the alternative zeolitic material comprises a first peak (P"1) comprised in the range of from −111.2 to −112.8 ppm; and a second peak (P"2) comprised in the range of from −101.4 to −103.0 ppm.

According to the present invention, it is preferred that the deconvoluted $^{29}Si$ MAS NMR spectrum of the zeolitic materials of the present invention comprise a further peak comprised in the range of from −113.2 to −115.2 ppm, wherein more preferably said additional peak is comprised in the range of from −113.5 to −114.9 ppm. According to particularly preferred embodiments of the present invention, the zeolitic materials comprise a further peak in the deconvoluted $^{29}Si$ MAS NMR spectrum comprised in the range of from −113.8 to −114.7 ppm. In principle, as regards the deconvoluted $^{29}Si$ MAS NMR spectrum, any suitable method may be employed for deconvolution thereof provided that said method is able to identify a further peak in the $^{29}Si$ MAS NMR spectrum of the zeolitic materials of the present invention. According to the present invention it is however preferred that the deconvolution is performed using DMFit (Massiot et al., *Magnetic Resonance in Chemistry*, 40 (2002) pp. 70-76). In particular, it is preferred that according to said method the fitting model is comprised of three Gaussian functions, with starting positions at −103 ppm, −112 ppm and −114 ppm. Furthermore, it is preferred that both peak position and line width are left unrestrained, with the consequence that the fit peaks are not fixed at a certain position.

According to the present invention, it is preferred that at least a portion of the Y atoms and/or of the X atoms of the MFI-type framework structure of the zeolitic materials is isomorphously substituted by one or more elements. In this respect, there is no particular restriction as to the one or more elements which may substitute Y atoms and/or X atoms of the MFI-type framework structure wherein preferably said elements are selected from the group consisting of B, Fe, Ti, Sn, Ga, Ge, Zr, V, Nb, Cu, Zn, Li, Be, and mixtures of two or more thereof, wherein even more preferably, the one or more elements are selected from the group consisting of B, Fe, Ti, Sn, Zr, Cu, and mixtures of two or more thereof. According to particularly preferred embodiments and in particular according to particularly preferred embodiments of the alternative zeolitic material of the present invention, at least a portion of the Y atoms and/or of the X atoms in the MFI-type framework structure is isomorphously substituted by Ti and/or B, and preferably by Ti. According to particularly preferred embodiments of the present invention, the alternative zeolitic material is an isomorphously substituted zeolitic material according to any one of the aforementioned particular and preferred embodiments of the present invention, and particularly preferably is a Ti-isomorphously substituted zeolitic material having the MFI-type framework structure, which according to a particularly preferred embodiment is TS-1.

As regards the amount of the one or more elements in the zeolitic materials which substitute at least a portion of the Y atoms and/or of the X atoms in the MFI-type framework structure, no particular restriction applies according to the present invention. Thus, by way of example, the molar ratio of $YO_2$ to the one or more elements isomorphously substituted in the MFI-type framework structure may range anywhere from 5 to 100, wherein the molar ratio is preferably comprised in the range of from 10 to 80, more preferably of from 20 to 70, more preferably of from 25 to 65, more preferably of from 30 to 50, and even more preferably of from 35 to 45. According to particularly preferred embodiments, the molar ratio of $YO_2$ to the one or more elements isomorphously substituting Y atoms and/or X atoms in the MFI-type framework structure are comprised in the range of from 38 to 40.

With respect to preferred embodiments of the present invention wherein the zeolitic materials further comprises $X_2O_3$, there is no particular restriction as to the amount thereof which may be contained in the MFI-type framework structure. Thus, by way of example, the $YO_2:X_2O_3$ molar ratio of the zeolitic materials may be comprised anywhere in the range of from 2 to 200, wherein preferably the $YO_2:X_2O_3$ molar ratio is comprised in the rage of from 3 to 160, more preferably of from 5 to 140, more preferably of from 8 to 120, more preferably of from 10 to 100, and even more preferably of from 15 to 80. According to particularly preferred embodiments of the present invention, the $YO_2:X_2O_3$ molar ratio of the zeolitic materials is comprised in the range of from 20 to 60. In alternative embodiments of the present invention and in particular with respect to the alternative zeolitic material in accordance with any of the particular and preferred embodiments thereof described in the present application, it is preferred that the MFI-type framework structure does not contain any substantial amount of $Al_2O_3$, and even more preferably does not contain any substantial amount of $X_2O_3$, wherein X stands for Al, B, In, Ga, and mixtures of two or more thereof. According to particularly preferred embodiments of the zeolitic materials and in particular of the alternative zeolitic material of the present invention, the MFI-type framework structure does not contain any substantial amounts of $X_2O_3$, wherein X is a trivalent element. Within the meaning of the present invention, the term "substantial" as employed with respect to the amount of $X_2O_3$ and in particular of $Al_2O_3$ which may be contained in the zeolitic materials, said term indicates an amount of 0.1 wt.-% or less of $X_2O_3$ based on 100 wt.-% of the zeolitic material, more preferably an mount of 0.05 wt.-% or less, more preferably of 0.001 wt.-% or less, more preferably of 0.0005 wt.-% ort less and even more preferably an amount of 0.0001 wt.-% or less thereof.

According to the present invention, the zeolitic materials having an MFI-type framework structure comprises $YO_2$. In principle, Y stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Zr, or any combination of said tetravalent elements, even more preferably for Si, and/or Sn. According to the present invention, it is particularly preferred that Y stands for Si.

As regards $X_2O_3$ optionally comprised in the MFI-framework structure of the zeolitic materials, X may in principle stand for any conceivable trivalent element, wherein X stands for one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

In addition to the framework elements of the zeolitic materials of the present invention having an MFI-type framework structure, said zeolitic materials preferably further contains one or more types of non-framework elements which do not constitute the framework structure and are accordingly present in the pores and/or cavities formed by the framework structure and typical for zeolitic materials in general. In this respect, there is no particular restriction as to the types of non-framework elements which may be contained in the zeolitic materials, nor with respect to the amount in which they may be present therein. It is, however, preferred that the zeolitic materials comprise one or more cation and/or cationic elements as ionic non-framework elements, wherein again no particular restriction applies as to the type or number of different types of ionic non-framework elements which may be present in the zeolitic materials, nor as to their respective amount. According to preferred embodiments of the present invention, the ionic non-framework elements preferably comprise one or more cations and/or cationic elements selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, wherein more preferably these are selected from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof. According to particularly preferred embodiments of the present invention, the ionic non-framework elements comprise one or more cations and/or cationic elements selected from the group consisting of Mg, Mo, Fe, Ni, Cu, Zn, Ag, and mixtures of two or more thereof.

There is no particular restriction according to the present invention as to the suitable physical and/or chemical characteristics of the inventive zeolitic materials. Thus, as regards for example the porosity and/or surface area of the inventive materials, these may adopt any suitable values. Thus, as regards the BET surface area of the zeolitic materials as determined according to DIN 66135, it may accordingly range anywhere from 50 to 700 $m^2/g$, wherein preferably the surface area of the inventive zeolitic materials is comprised in the range of from 100 to 650 $m^2/g$, more preferably from 200 to 600 $m^2/g$, more preferably from 300 to 550 $m^2/g$, more preferably from 350 to 500 $m^2/g$, and even more preferably from 390 to 470 $m^2/g$. According to particularly preferred embodiments of the present invention, the BET surface area of the zeolitic materials as determined according to DIN 66135 ranges from 420 to 440 $m^2/g$.

Depending on the specific needs of its application, the zeolitic materials of the present invention can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising one or more of the inventive zeolitic materials.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the particles of the one or more zeolitic materials to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the one or more of the zeolitic materials according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

One or more of the zeolitic materials of the present invention may therefore also be provided in the form of extrudates, pellets, tablets or particles of any other suitable shape, for use as a packed bed of particulate catalyst, or as shaped pieces such as plates, saddles, tubes, or the like.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promoters, or the like. Typically, the carrier comprises a member, often referred to as a "honeycomb" carrier, comprising one or more refractory bodies having a plurality of fine, parallel gas flow passages extending there through. Such carriers are well known in the art and may be made of any suitable material such as cordierite or the like.

In general, the zeolitic materials described above can be used as molecular sieve, adsorbent, catalyst, catalyst support or binder thereof. For example, the zeolitic materials can be used as molecular sieve to dry gases or liquids, for selective molecular separation, e.g. for the separation of hydrocarbons or amines; as ion exchanger; as chemical carrier; as adsorbent, in particular as adsorbent for the separation of hydrocarbons or amines; or as a catalyst. Most preferably, the zeolitic materials according to the present invention is used as a catalyst and/or as a catalyst support.

According to a preferred embodiment of the present invention, one or more of the zeolitic materials of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond.

Furthermore, it is preferred according to the present invention that one or more of the zeolitic materials is used as a molecular trap for organic compounds. In general, any type of organic compound may be trapped in the zeolitic materials, wherein it is preferred that the compound is reversibly trapped, such that it may be later released from the zeolitic materials, preferably wherein the organic compound is released—preferably without conversion thereof—by an increase in temperature and/or a decrease in pressure. Furthermore, it is preferred that one or more of the zeolitic materials is used to trap organic compounds of which the dimensions allow them to penetrate the microporous system of the molecular structure. According to yet further embodiments of the present invention, it is preferred that the trapped compounds are released under at least partial conversion thereof to a chemical derivative and/or to a decomposition product thereof, preferably to a thermal decomposition product thereof.

When preparing specific catalytic compositions or compositions for different purposes, it is also conceivable to blend one or more of the zeolitic materials according to the present invention with at least one other catalytically active material or a material being active with respect to the intended purpose. It is also possible to blend at least two different inventive materials which may differ in their $YO_2$:$X_2O_3$ molar ratio, wherein the two different inventive materials even more preferably in their $SiO_2:Al_2O_3$ molar ratio. It is also possible to blend at least two different inventive materials with at least one other catalytically active material or a material being active with respect to the intended purpose.

As regards the applications in which the inventive zeolitic materials may be employed, these may be used in any conceivable way, wherein they are preferably used as a molecular sieve, as an adsorbent, for ion-exchange, as a catalyst and/or as a catalyst support. With respect to specific catalytic applications in which they may be employed, no particular restriction applies provided that a catalytic effect may be achieved and/or enhanced, wherein the zeolitic materials are preferably used as a catalyst for an acid-catalyzed and/or oxidation reaction, and more preferably as a catalyst for one or more of an isomerization reaction, preferably the isomerization of one or more hydrocarbons, an alkylation reaction, an acylation reaction, an epoxidation reaction, an ammoxidation reaction, and combinations thereof. According to particularly preferred embodiments of the present invention, the zeolitic material is used as an epoxidation catalyst.

The present invention includes the following embodiments, wherein these include the specific combinations of embodiments as indicated by the respective interdependencies defined therein:

1. A process for the preparation of a zeolitic material comprising the steps of:
   (1) providing a mixture comprising one or more sources for $YO_2$ and one or more alkenyltrialkylammonium cation $R^1R^2R^3R^4N^+$-containing compounds as structure directing agent; and
   (2) crystallizing the mixture obtained in step (1) to obtain a zeolitic material;
   wherein Y is a tetravalent element, and
   wherein $R^1$, $R^2$, and $R^3$ independently from one another stand for alkyl; and
   $R^4$ stands for alkenyl.

2. The process of embodiment 1, wherein $R^1$, $R^2$, and $R^3$ independently from one another stand for $(C_1-C_6)$alkyl, preferably for $(C_1-C_5)$alkyl, more preferably for $(C_1-C_4)$alkyl, more preferably for $(C_2-C_4)$alkyl, more preferably for $(C_2-C_3)$alkyl, more preferably for branched or unbranched propyl, and even more preferably for n-propyl, and
   wherein $R^4$ stands for $(C_2-C_6)$alkenyl, preferably for $(C_2-C_5)$alkenyl, more preferably for $(C_2-C_4)$alkenyl, more preferably for $(C_2-C_3)$alkenyl, more preferably for 2-propen-1-yl, 1-propen-1-yl, or 1-propen-2-yl, more preferably 2-propen-1-yl or 1-propen-1-yl.

3. The process of embodiment 2, wherein the structure directing agent provided in step (1) comprises one or more compounds selected from the group consisting of N—$(C_2-C_5)$alkenyl-tri-$(C_1-C_5)$alkylammonium hydroxides, preferably from the group consisting of N—$(C_2-C_4)$alkenyl-tri-$(C_1-C_4)$alkylammonium hydroxides, more preferably from the group consisting of N—$(C_2-C_3)$alkenyl-tri-$(C_2-C_4)$alkylammonium hydroxides, more preferably from the group consisting of N-(2-propen-1-yl)-tri-n-propylammonium hydroxide, N-(1-propen-1-yl)-tri-n-propylammonium hydroxide, N-(1-propen-2-yl)-tri-n-propylammonium hydroxide, and mixtures of two or more thereof, wherein more preferably the structure directing agent comprises N-(2-propen-1-yl)-tri-n-propylammonium hydroxide and/or N-(1-propen-1-yl)-tri-n-propylammonium hydroxide.

4. The process of any of embodiments 1 to 3, wherein the mixture provided in step (1) comprises two or more $R^1R^2R^3R^4N^+$-containing compounds, wherein $R^4$ of the two or more compounds are different from one another and stand for $(C_2-C_6)$alkenyl, preferably for $(C_2-C_5)$alkenyl, more preferably for $(C_2-C_4)$alkenyl, more preferably for $(C_2-C_3)$alkenyl, more preferably for 2-propen-1-yl, 1-propen-1-yl, or 1-propen-2-yl, and even more preferably for 2-propen-1-yl and 1-propen-1-yl.

5. The process of embodiment 4, wherein the mixture provided in step (1) comprises two $R^1R^2R^3R^4N^+$-containing compounds, wherein $R^4$ of the first compound (A) contains an end-chain —CH=CH$_2$ moiety, and $R^4$ of the second compound (B) contains an end-chain moiety —CH$_3$, and
   wherein the molar ratio A:B in the mixture provided in step (1) is preferably comprised in the range of from 25:75 to 99:1, more preferably of from 50:50 to 98:2, more preferably of from 75:25 to 97:3, more preferably of from 85:15 to 96:4, and even more preferably of from 90:10 to 95:5.

6. The process of embodiment 5, wherein the compounds A and B are constitutional isomers with respect to the position of the double bond in $R^4$, and wherein said constitutional isomers are preferably N-(2-propen-1-yl)-tri-n-propylammonium hydroxide and N-(1-propen-1-yl)-tri-n-propylammonium hydroxide.

7. The process of any of embodiments 1 to 6, wherein Y is selected from the group consisting of Si, Sn, Ti, Zr, Ge, and mixtures of two or more thereof, Y preferably being Si.

8. The process of any of embodiments 1 or 7, wherein the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, and mixtures of two or more thereof,
   preferably from the group consisting of fumed silica, silica hydrosols, reactive amorphous solid silicas, silica gel, colloidal silica, pyrogenic silica, tetraalkoxysilanes, and mixtures of two or more thereof,
   more preferably from the group consisting of fumed silica, reactive amorphous solid silicas, silica gel, pyrogenic silica, $(C_1-C_3)$tetraalkoxysilanes, and mixtures of two or more thereof,
   more preferably from the group consisting of fumed silica, $(C_1-C_2)$tetraalkoxy-silanes, and mixtures of two or more thereof,
   wherein even more preferably the one or more sources for $YO_2$ comprises fumed silica and/or tetraethoxysilane.

9. The process of any of embodiments 1 to 8, wherein the mixture provided in step (1) further comprises one or more sources for $X_2O_3$, wherein X is a trivalent element.

10. The process of embodiment 9, wherein X is selected from the group consisting of Al, B, In, Ga, and mixtures of two or more thereof, X preferably being Al and/or B, and more preferably being Al.

11. The process of embodiment 9 or 10, wherein the one or more sources for $X_2O_3$ comprises one or more compounds selected from the group consisting of aluminum, aluminum alkoxides, alumina and/or one or more aluminates, preferably one or more aluminates, more preferably one or more aluminate salts selected from the group consisting of alkali metal aluminates, aluminum hydroxide, and mixtures of two or more thereof, wherein more preferably the one or more sources for $X_2O_3$ comprises aluminum hydroxide and/or one or more alkali metal aluminates, the alkali metal preferably being sodium and/or potassium, more preferably sodium.
12. The process of any of embodiments 9 to 11, wherein the $YO_2:X_2O_3$ molar ratio of the mixture according to step (1) ranges from 0.5 to 500, preferably from 1 to 400, more preferably from 5 to 300, more preferably from 20 to 200, more preferably from 30 to 150, more preferably from 35 to 120, and even more preferably from 40 to 100.
13. The process of any of embodiments 1 to 8 and 10, wherein the mixture provided in step (1) does not contain a source for $X_2O_3$, wherein X is a trivalent element.
14. The process of any of embodiments 1 to 13, wherein the mixture according to step (1) further comprises one or more solvents, wherein said one or more solvents preferably comprises water, more preferably distilled water.
15. The process of embodiment 14, wherein the $H_2O:YO_2$ molar ratio of the mixture according to step (1) ranges from 3 to 100, more preferably from 5 to 50, more preferably from 6 to 30, more preferably from 7 to 20, more preferably from 8 to 15, and even more preferably from 9 to 12.
16. The process of any of embodiments 1 to 15, wherein the molar ratio of the one or more alkenyltrialkylammonium cations $R^1R^2R^3R^4N^+:YO_2$ in the mixture provide according to step (1) ranges from 0.01 to 5, preferably from 0.03 to 2, more preferably from 0.05 to 1, more preferably from 0.1 to 0.5, more preferably from 0.13 to 0.3, and even more preferably from 0.15 to 0.2.
17. The process of any of embodiments 1 to 16, wherein the mixture according to step (1) further comprises one or more sources of one or more elements suitable for isomorphous substitution of at least a portion of the Y atoms and/or of the X atoms in the zeolite framework structure, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti.
18. The process of embodiment 17, wherein the one or more sources for isomorphous substitution preferably comprises one or more titania precursor compounds, preferably one or more compounds selected from the group consisting of titanic acids, titanic acid esters, and mixtures of two or more thereof, wherein more preferably the one or more sources for isomorphous substitution comprises one or more titanic acid esters, preferably one or more tetraalkoxytitanates, more preferably one or more ($C_1$-$C_3$) tetraalkoxytitanates, more preferably one or more ($C_1$-$C_2$) tetraalkoxytitanates, wherein even more preferably the one or more sources for isomorphous substitution comprises tetraethoxytitanate.
19. The process of embodiment 17 or 18, wherein the molar ratio of $YO_2$ to the one or more elements suitable for isomorphous substitution of at least a portion of the Y atoms and/or of the X atoms in the zeolite framework structure ranges from 1 to 300, more preferably from 5 to 150, more preferably from 10 to 100, more preferably from 20 to 70, more preferably from 25 to 50, and even more preferably from 30 to 40.
20. The process of any of embodiments 1 to 19, wherein the crystallization in step (2) involves heating of the mixture, preferably at a temperature ranging from 90 to 210° C., preferably from 110 to 200° C., more preferably from 130 to 190° C., more preferably from 145 to 180° C., and even more preferably from 155 to 170° C.
21. The process of embodiment 20, wherein the crystallization in step (2) is conducted under solvothermal conditions, preferably under hydrothermal conditions.
22. The process of embodiment 20 or 21, wherein the crystallization in step (2) involves heating of the mixture for a period ranging from 5 to 120 h, more preferably from 8 to 80 h, more preferably 10 to 50 h, more preferably from 13 to 35 h, and even more preferably from 15 to 25 h.
23. The process of any of embodiments 1 to 22, wherein the crystallization in step (2) involves agitating the mixture, preferably by stirring.
24. The process of any of embodiments 1 to 23 further comprising one or more of the following steps of
   (3) isolating the zeolitic material, preferably by filtration, and/or
   (4) washing the zeolitic material, and/or
   (5) drying the zeolitic material, and/or
   (6) subjecting the zeolitic material to an ion-exchange procedure,
   wherein the steps (3) and/or (4) and/or (5) and/or (6) can be conducted in any order, and
   wherein one or more of said steps is preferably repeated one or more times.
25. The process of embodiment 24, wherein in the at least one step (6) one or more ionic non-framework elements contained in the zeolite framework is ion-exchanged, preferably against one or more cations and/or cationic elements, wherein the one or more cation and/or cationic elements are preferably selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof, wherein the one or more ionic non-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, even more preferably Na.
26. The process of any of embodiments 1 to 25, wherein the zeolitic material formed in step (2) comprises one or more zeolites having the MFI-type framework structure, wherein the zeolitic material preferably comprises one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, wherein more preferably the zeolitic material comprises ZSM-5, Silicalite, TS-1, or mixtures of two or more thereof, wherein even more preferably the zeolitic material formed in step (2) comprises ZSM-5 and/or TS-1.

27. A synthetic zeolitic material having an MFI-type framework structure obtainable and/or obtained according to any one of embodiments 1 to 26.

28. A synthetic zeolitic material having an MFI-type framework structure comprising $YO_2$ and optionally comprising $X_2O_3$,
    wherein Y is a tetravalent element, and X is a trivalent element,
    said material having an X-ray diffraction pattern comprising at least the following reflections:

| Intensity (%) | Diffraction angle 2θ/° [Cu K(alpha 1)] |
|---|---|
| 15-55 | 7.88-8.16 |
| 11-35 | 8.83-9.13 |
| 100 | 23.04-23.46 |
| 27-40 | 23.68-23.89 |
| 21-66 | 23.90-24.23 |
| 22-44 | 24.29-24.71 | wherein 100% relates to the intensity of the maximum peak in the X-ray powder diffraction pattern.

29. The zeolitic material of embodiment 28, wherein the $^{29}Si$ MAS NMR of the zeolitic material comprises:
    a first peak (P1) in the range of from −110.4 to −114.0, preferably of from −110.8 to −113.4 ppm, and even more preferably of from −111.2 to −112.8 ppm; and
    a second peak (P2) in the range of from −101.4 to −106.8 ppm, preferably of from −101.6 to −106.5 ppm, and even more preferably of from −101.8 to −106.2 ppm.

30. The zeolitic material of embodiment 28 or 29, wherein the $^{27}Al$ MAS NMR of the zeolitic material comprises:
    a first peak (P'1) in the range of from 50.00 to 53.50 ppm, preferably of from 50.50 to 52.80 ppm, more preferably of from 50.70 to 52.50 ppm, and even more preferably of from 50.85-52.30 ppm; and
    a second peak (P'2) in the range of from −0.50 to −2.00 ppm, preferably of from −0.80 to −1.70 ppm, more preferably of from −1.00 to −1.50 ppm, and even more preferably of from −1.10 to −1.35 ppm;
    wherein the integration of the first and second peaks in the $^{27}Al$ MAS NMR of the zeolitic material preferably offers a ratio of the integration values P'1:P'2 of 1:(0.5-1.2), preferably of 1:(0.1-0.9), more preferably of 1:(0.2-0.7), more preferably of 1:(0.3-0.6), more preferably of 1:(0.35-0.55), and even more preferably of 1:(0.4-0.5).

31. A synthetic zeolitic material having an MFI-type framework structure comprising $YO_2$ and optionally comprising $X_2O_3$,
    wherein Y is a tetravalent element, and X is a trivalent element, said material having an X-ray diffraction pattern comprising at least the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern.

32. The zeolitic material of embodiment 31, wherein the $^{29}Si$ MAS NMR of the zeolitic material comprises:
    a first peak (P"1) in the range of from −110.4 to −114.0 ppm, preferably of from −110.8 to −113.4 ppm, and even more preferably of from −111.2 to −112.8 ppm; and
    a second peak (P"2) in the range of from −100.2 to −104.2 ppm, preferably of from −100.8 to −103.6 ppm, and even more preferably of from −101.4 to −103.0 ppm.

33. The zeolitic material of embodiment 29 or 32, wherein the deconvoluted $^{29}Si$ MAS NMR spectrum comprises one additional peak comprised in the range of from −113.2 to −115.2 ppm, more preferably of from −113.5 to −114.9 ppm, and even more preferably of from −113.8 to −114.7 ppm.

34. The zeolitic material of any of embodiments 29 to 33, wherein at least a portion of the Y atoms and/or of the X atoms in the MFI-type framework structure is isomorphously substituted by one or more elements, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti.

35. The zeolitic material of embodiment 34, wherein the molar ratio of $YO_2$ to the one or more element ranges from 5 to 100, preferably from 10 to 80, more preferably from 20 to 70, more preferably from 25 to 65, more preferably from 30 to 50, more preferably from 35 to 45, and even more preferably from 38 to 40.

36. The zeolitic material of any of embodiments 28 to 35, wherein the $YO_2:X_2O_3$ molar ratio ranges from 2 to 200, preferably from 3 to 160, more preferably from 5 to 140, more preferably from 8 to 120, more preferably from 10 to 100, more preferably from 15 to 80, and even more preferably from 20 to 60.

37. The zeolitic material of any of embodiments 28 to 36, wherein the MFI-type framework structure of the zeolitic material does not contain $X_2O_3$.

38. The zeolitic material of any of embodiments 28 to 37, wherein Y is selected from the group consisting of Si, Sn, Ti, Zr, Ge, and mixtures of two or more thereof, Y preferably being Si.

39. The zeolitic material of any of embodiments 28 to 38, wherein X is selected from the group consisting of Al, B, In, Ga, and mixtures of two or more thereof, X preferably being Al and/or B, and more preferably being Al.

40. The zeolitic material of any of embodiments 28 to 39, wherein the zeolitic material comprises one or more cation and/or cationic elements as ionic non-framework elements, said one or more cation and/or cationic elements preferably comprising one or more selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof.

41. The zeolitic material of any of embodiments 28 to 40, wherein the BET surface area of the zeolitic material determined according to DIN 66135 ranges from 50 to 700 m$^2$/g, preferably from 100 to 650 m$^2$/g, more preferably from 200 to 600 m$^2$/g, more preferably from 300 to 550 m$^2$/g, more preferably from 350 to 500 m$^2$/g, more preferably from 390 to 470 m$^2$/g, more preferably from 420 to 440 m$^2$/g.

42. Use of an alkenyltrialkylammonium cation $R^1R^2R^3R^4N^+$-containing compound as structure directing agent in the synthesis of microporous materials, preferably in the synthesis of zeolitic materials, wherein
$R^1$, $R^2$, and $R^3$ independently from one another stand for ($C_1$-$C_6$)alkyl, more preferably for ($C_1$-$C_5$)alkyl, more preferably for ($C_1$-$C_4$)alkyl, more preferably for ($C_2$-$C_4$)alkyl, more preferably for ($C_2$-$C_3$)alkyl, more preferably for branched or unbranched propyl, and even more preferably for n-propyl; and
$R^4$ stands for ($C_2$-$C_6$)alkenyl, more preferably for ($C_2$-$C_5$)alkenyl, more preferably for ($C_2$-$C_4$)alkenyl, more preferably for ($C_2$-$C_3$)alkenyl, more preferably for 2-propen-1-yl, 1-propen-1-yl, or 1-propen-2-yl, more preferably 2-propen-1-yl or 1-propen-1-yl, and even more preferably 2-propen-1-yl.

43. Use of a zeolitic material according to any of embodiments 27 to 41 as a molecular sieve, as an adsorbent, for ion-exchange, as a catalyst and/or as a catalyst support, preferably as a catalyst for an acid-catalyzed and/or oxidation reaction, more preferably as a catalyst for one or more of an isomerization reaction, preferably the isomerization of one or more hydrocarbons, an alkylation reaction, an acylation reaction, an epoxidation reaction, an ammoxidation reaction, and combinations thereof, wherein even more preferably the catalyst is used as an epoxidation catalyst.

DESCRIPTION OF THE FIGURES

FIGS. 1a, 2a, 3, 4, and 7 respectively show the X-ray diffraction pattern (measured using Cu K alpha-1 radiation) of the crystalline materials obtained according to Examples 1, 2, 4, 5, and 7. In the figure, the angle 2 theta in ° is shown along the abscissa and the intensities are plotted along the ordinate.

FIGS. 1b and 2b respectively show the water adsorption/desorption isotherms obtained for the crystalline materials obtained according to Examples 1 and 2, wherein the solid line indicates the adsorption of water into the material, and the dotted line shows the desorption of water from the material. In the figure, the relative humidity in % is shown along the abscissa, whereas the weight-% of water contained in the material based on 100 wt.-% of the sample is plotted along the ordinate.

EXAMPLES

Figure 1B:
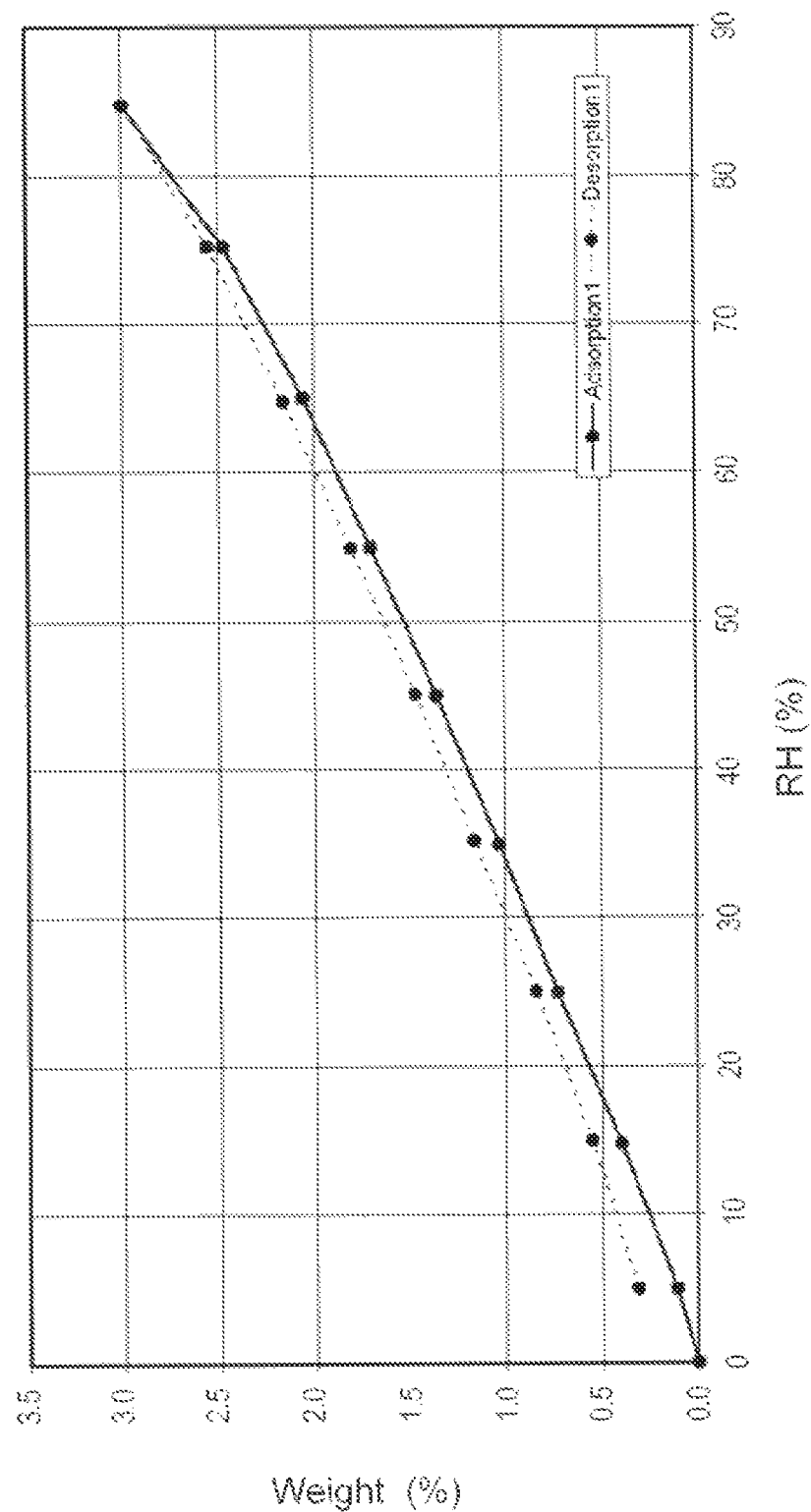

X-ray diffraction experiments on the powdered materials were performed using an Advance D8 Series 2 Diffractometer (Bruker/AXS) equipped with a Sol-X detector using the Cu K alpha-1 radiation.

The water adsorption isotherms of the samples were obtained using a VTI SA instrument from TA Instruments following a step-isotherm program. The experiment consisted of a run or a series of runs performed on a sample material that has been placed on the microbalance pan inside of the instrument. Before the measurement were started, the residual moisture of the sample was removed by heating the sample to 100° C. (heating ramp of 5° C./min) and holding it for 6 h under a N$_2$ flow. After the drying program, the temperature in the cell was decreased to 25° C. and kept isothermal during the measurements. The micro-balance was calibrated, and the weight of the dried sample was balanced (maximum mass deviation 0.01 wt. %). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10 wt. % from 5 to 85% and at each step the system controlled the RH and monitored the sample weight until reaching the equilibrium conditions and recording the weight uptake. The total adsorbed water amount by the sample was taken after the sample was exposed to the 85 weight-% RH. During the desorption measurement the RH was decreased from 85 wt. % to 5 wt. % with a step of 10% and the change in the weight of the sample (water uptake) was monitored and recorded.

$^{29}$Si CP-MAS solid-state NMR experiments were performed using a Bruker Avance spectrometer with 300 MHz $^1$H Larmor frequency (Bruker Biospin, Germany). Samples were packed in 7 mm ZrO$_2$ rotors, and measured under 5 kHz Magic Angle Spinning at room temperature. $^{29}$Si spectra were obtained using $^{29}$Si ($\pi$/2)-pulse excitation with 5 µs pulse width, a $^{29}$Si carrier frequency corresponding to −62 to −64 ppm in the spectrum, and a scan recycle delay of 120 s. Signal was acquired for 25 ms under 45 kHz high-power proton decoupling, and accumulated for up to 17 hours. Spectra were processed using Bruker Topspin with 30 Hz exponential line broadening, manual phasing, and manual baseline correction over the full spectrum width. Spectra were referenced with the polymer Q8M8 as an external secondary standard, by setting the resonance of the trimethylsilyl M group to 12.5 ppm.

BET and pore volume (N$_2$) of the samples as indicated below were measured following the DIN 66134 procedure and the Hg-porosimetry following the DIN 66133 procedure.

Synthesis of Allyltripropylammoniumhydroxide (ATPAOH)

The synthesis of the organic template ATPAOH was conducted in two steps, wherein in a first step tripropylamine was alkylated with allylchloride. To this effect, 1716 g tripropylamine were placed in an a 6 l glass reactor (HWS) to which 829 g was then added methanol and the mixture heated to 60° C. under stirring. 984 g allylchloride in 300 g methanol was then added over a period of 1.75 h. The reaction mixture was then stirred at 60-70° C. for 24 h.

The solvent was removed by heating at 70° C. under reduced pressure (1 mbar) for obtaining 2495 g of a pale yellowish solid. The product was identified as allyltripropylammonium chloride by $^1$H, $^{13}$C and elementary analysis. The residual content of methanol was determined to be 4.3 wt %, thus affording a yield of 91%. The allyltripropylammonium chloride was then dissolved in 6238 g of distilled water yielding an aqueous solution with a solid content of ~40 wt. %.

The aqueous solution thus obtained was then portioned and diluted to a concentration of 8 wt.-%. 5463 g thereof were run through a column which was filled with 3750 ml of a strong base ion exchange resin (Ambersep 9000H from Dow). The anion of the product was thus changed from chloride to hydroxide. After the loading step, the ion exchange resin was then washed with distilled water (11,456 g) to minimize product loss.

Both, the treated product (now in hydroxide form) and the washing water were collected and then concentrated by evaporation to afford a 40 wt.-% aqueous allytripropylammonium hydroxide solution.

Example 1

Synthesis of TS-1 with ATPAOH (Isomer Ratio 95:5)

In a round bottom flask 500 g of tetraethylorthosilicate (TEOS) was added together with 15 g or tetraethylorthotitanate (TEOTi). 220 g of a solution of ATPAOH (40 wt. %; N-(2-propen-1-yl)-tri-n-propylammonium:N-(1-propen-1-yl)-tri-n-propylammonium molar ratio of 95:5) and 300 g of distilled water were added under stirring to the flask containing the Si and Ti source. A yellow blurry solution is obtained after mixing all the components. After 10 min of stirring the temperature of the slurry was 35° C. and the color of the solution became clear yellow. After 20 min of stirring the temperature reaches 44° C. and the solution became blurry again. After 30 min of stirring the temperature of the slurry reaches 54° C. and it became again a clear yellow solution. After 1 h the hydrolysis of the silica and titanium sources was finished and the temperature of the mixture was constant at 54° C. The ethanol resulted from the hydrolysis of TEOS and TEOTi was than separated by distillation from the synthesis mixture at 95° C. for 2 h. During the distillation procedure, the solution was continuously stirred with 100 U/min, wherein 538 g of ethanol-distillate were obtained.

After the distillation, 603 g of distilled water were added to the synthesis mixture and the solution was stirred for another hour at room temperature. Finally, the suspension was transferred in a 2.5 L stainless steel autoclave equipped with mechanical stirring. The autoclave was heated to 175° C. and kept for 16 h under continuous stirring (200 U/min).

After 16 h the autoclave was cooled to room temperature and distilled water was added to the suspension in a volumetric ratio of 1:1 (pH of the solution 12.1). The pH was reduced to 7.2 by adding a solution of 5 wt. % $HNO_3$. The suspension was than filtered on a Büchner filter and the solid was washed several times with water. The white solid was dried for 4 h at 120° C. and calcined for 5 h at 490° C. under air, using the following calcination program: heating within 60 min to 120° C., temperature held for 240 min at 120° C., then heating within 370 min from 120 to 490° C. and temperature held for 300 min at 490° C.

The characterization of the final product by XRD as shown in FIG. 1a shows that the product has the typical MFI structure characteristic of the TS-1 (100% crystallinity and less than 0.5% Anatas crystallites). The ICP analysis indicated an elemental composition of Si (43 wt. %) and Ti (1.9 wt. %). The $N_2$ adsorption isotherm measurements indicated that the material has Langmuir surface area of 584 m$^2$/g and BET surface area of 429 m$^2$/g and a pore volume of 0.94 mL/g (based on Hg-porosimetry).

The water adsorption isotherm of the sample is shown in FIG. 1b.

Example 2

Synthesis of TS-1 with ATPAOH (Isomer Ratio 50:50)

The procedure of Example 1 was repeated, wherein 520 g of a 20 wt.-% of ATPAOH solution was employed having a N-(2-propen-1-yl)-tri-n-propylammonium:N-(1-propen-1-yl)-tri-n-propylammonium molar ratio of 50:50, and no distilled water was added for providing the initial mixture in the round bottom flask prior to the distillation of ethanol.

Figure 2A:
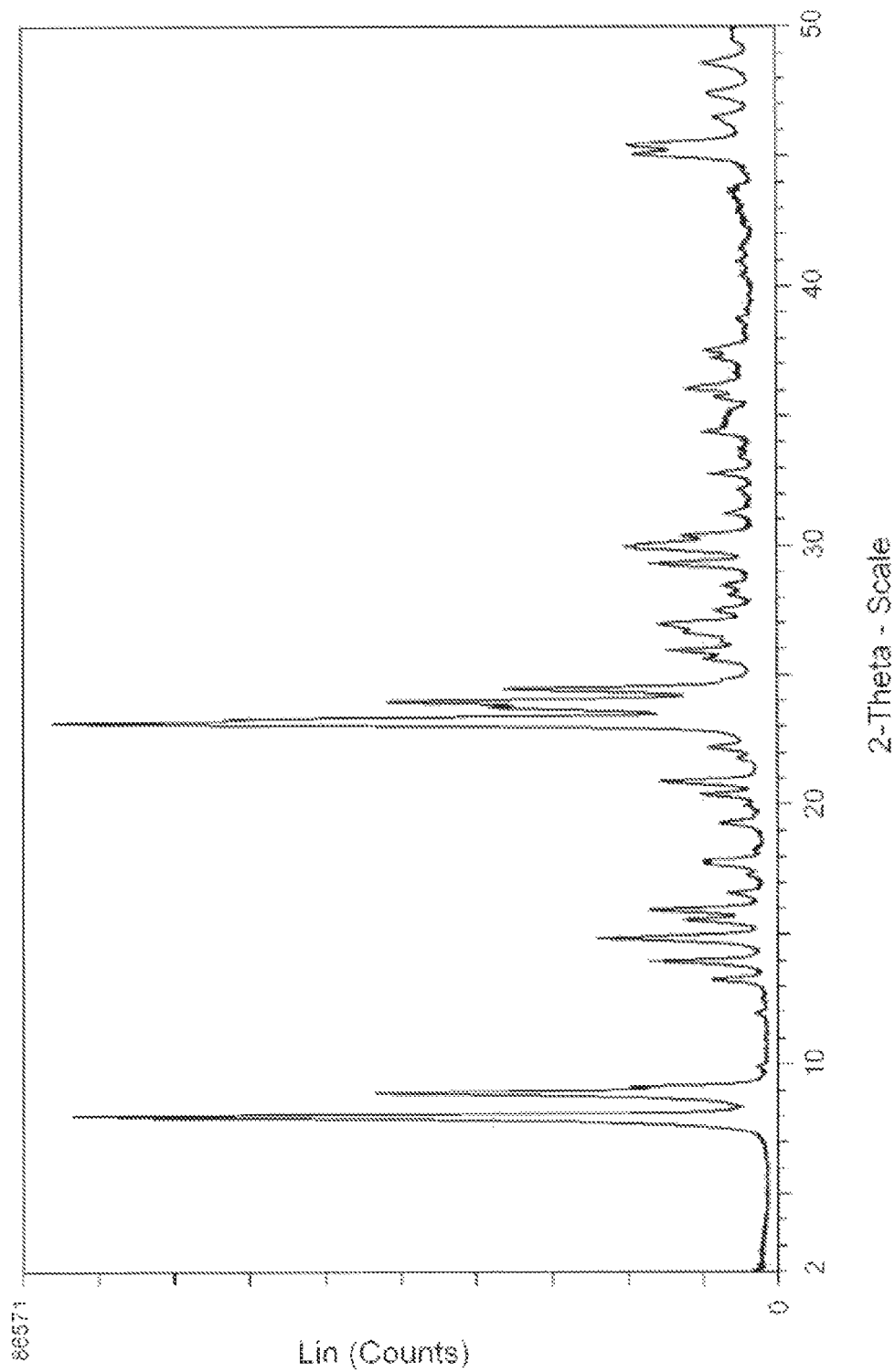

The characterization of the final product by XRD as shown in FIG. 2a shows that the product has the typical MFI structure characteristic of the TS-1 (91% crystallinity). The ICP analysis indicated an elemental composition of Si (44 wt. %) and Ti (2.0 wt. %). The $N_2$ adsorption isotherm measurements indicated that the material has a BET surface area of 436 m$^2$/g.

The water adsorption isotherm of the sample is shown in FIG. 2b.

Example 3

Synthesis of TS-1 with ATPAOH (Isomer Ratio 50:50)

The procedure of Example 1 was repeated, wherein 327 g of a 27 wt.-% of ATPAOH solution was employed having a N-(2-propen-1-yl)-tri-n-propylammonium:N-(1-propen-1-yl)-tri-n-propylammonium molar ratio of 50:50, and 193 g of distilled water were added for providing the initial mixture in the round bottom flask prior to the distillation of ethanol.

The characterization of the final product by XRD revealed that the product has the typical MFI structure characteristic of the TS-1 (92% crystallinity). The ICP analysis indicated an elemental composition of Si (44 wt. %) and Ti (2.0 wt. %). The $N_2$ adsorption isotherm measurements indicated that the material has a BET surface area of 437 m$^2$/g.

Example 4

Synthesis of High-Silica ZSM-5 with ATPAOH (Isomer Ratio 95:5)

137.6 ml of 20 wt-% ATPAOH(N-(2-propen-1-yl)-tri-n-propylammonium:N-(1-propen-1-yl)-tri-n-propylammonium molar ratio of 95:5) in distilled $H_2O$ was mixed in a 600 ml flask with Aerosil 200 (32.38 g). The mixture was stirred for 15 minutes. The dispersion was then transferred to a 0.25 L autoclave with a teflon inlay, which was afterwards heated to 150° C. for 120 h. After cooling, the solid formed was repeatedly washed with distilled water and dried at 120° C. for 16 h, for obtaining 31.2 g of a white powder which was then calcined 490° C. for 5 h. The molar yield based on $SiO_2$ was calculated to 95%.

The characterization of the material with a an average crystal size of 100 nm+/−20 nm by means of XRD as displayed in FIG. 3 shows a pure MFI structured material (100% crystallinity). The material has a BET surface area of 406 m$^2$/g, a Langmuir surface area of 556 m$^2$/g, a pore volume of 0.178 cm$^3$/g and a median pore width of 0.58 nm. The elemental analysis showed a carbon content of 0.063 wt-% sample. By means of SEM no side phase could be observed in the product.

The $^{29}$Si MAS NMR of the zeolitic material displays peaks at −102.4 and −112.1 ppm, wherein the integration of the peaks offers relative intensities of 0.575 and 1 for the signals, respectively. In the $^{29}$Si CP-MAS NMR of the zeolitic material, peaks are observed at −92.4, −102.4 and −111.8 ppm, wherein the integration of the peaks offers relative intensities of 0.176, 1.869 and 1 for the signals, respectively.

Example 5

Synthesis of ZSM-5 with ATPAOH (Isomer Ratio 95:5) Using Sodium Aluminate 136.9 ml of 20 wt-% ATPAOH(N-(2-propen-1-yl)-tri-n-propylammonium:N-(1-propen-1-yl)-tri-n-propylammonium molar ratio of 95:5) in distilled H$_2$O was mixed in a 600 ml flask with Aerosil 200 (32.00 g) and NaAlO$_2$ (2.02 g). The mixture was stirred for 15 minutes. The dispersion was transferred to a 0.25 L autoclave with a teflon inlay, which was afterwards heated to 150° C. for 120 h. After cooling, the formed solid was repeatedly washed with distilled water and dried at 120° C. for 16 h, for obtaining 30.2 g of a yellowish powder which was then calcined at 490° C. for 5 h. The molar yield based on SiO$_2$ was calculated to 92%.

Figure 4:
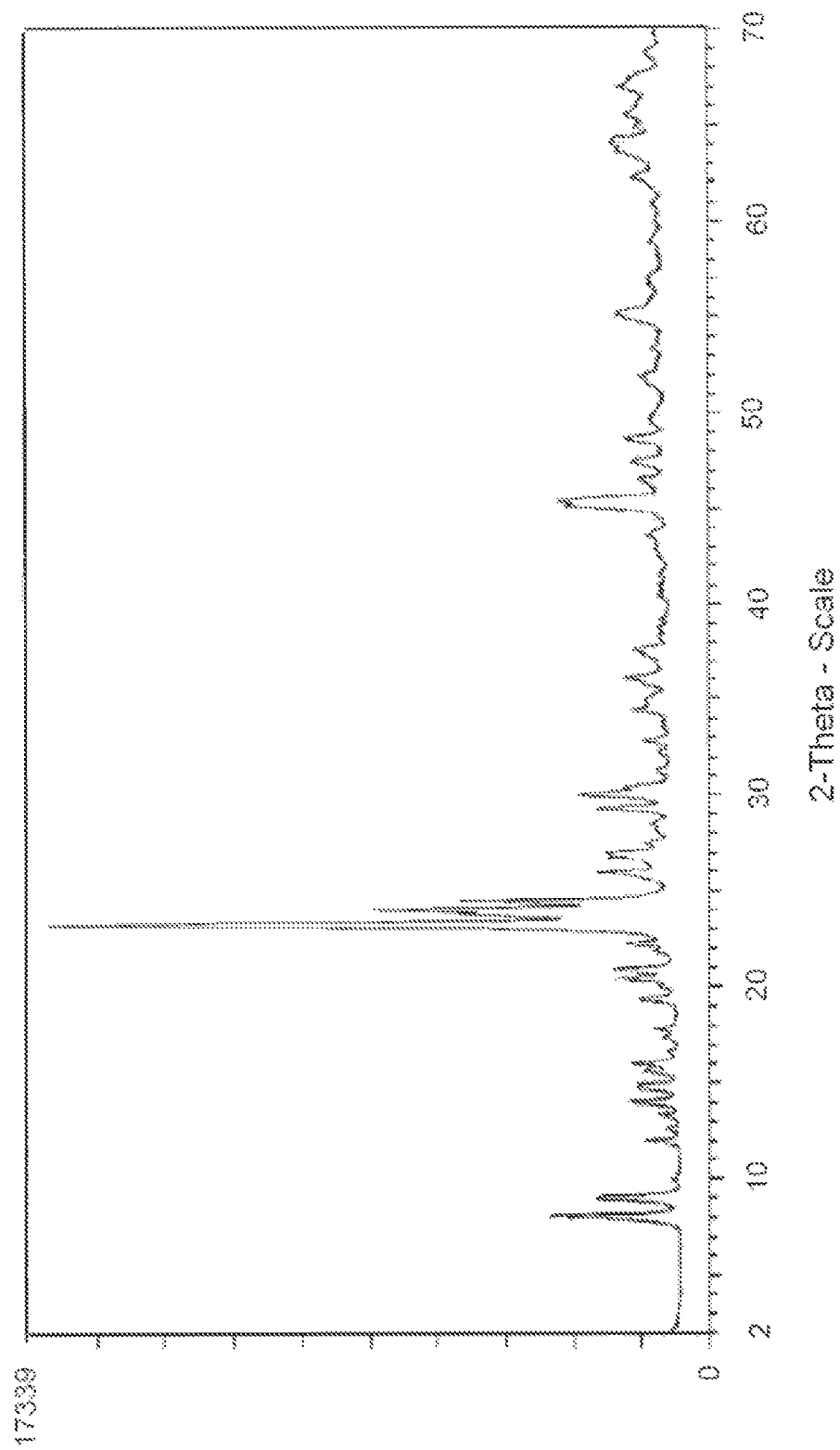

The characterization of the material with a an average crystal size of 48.5 nm+/−10 nm by means of XRD as displayed in FIG. 4 shows a pure MFI structured material (100% crystallinity). The material has a BET surface area of 392 m$^2$/g, a Langmuir surface area of 534 m$^2$/g, a pore volume of 0.171 cm$^3$/g and a median pore width of 0.77 nm. The elemental analysis showed 40 wt-% Si, 1.6 wt-% Al, 0.069 wt-% C and 0.46 wt-% Na in the sample, thus affording an Si:Al atomic ratio (SAR) of 24. By means of SEM no side phase could be observed in the product.

The $^{29}$Si MAS NMR of the zeolitic material displays peaks at −107.0 and −113.5 ppm, wherein the integration of the peaks offers relative intensities of 0.155 and 1 for the signals, respectively. In the $^{29}$Si CP-MAS NMR of the zeolitic material, peaks are observed at −91.6, −102.0 and −111.3 ppm, wherein the integration of the peaks offers relative intensities of 0.122, 1.663 and 1 for the signals, respectively.

The $^{27}$Al MAS NMR of the zeolitic material displays peaks at 50.9 and −1.3 ppm, wherein the integration of the peaks offers relative intensities of 1 and 0.453 for the signals, respectively.

Figure 5:
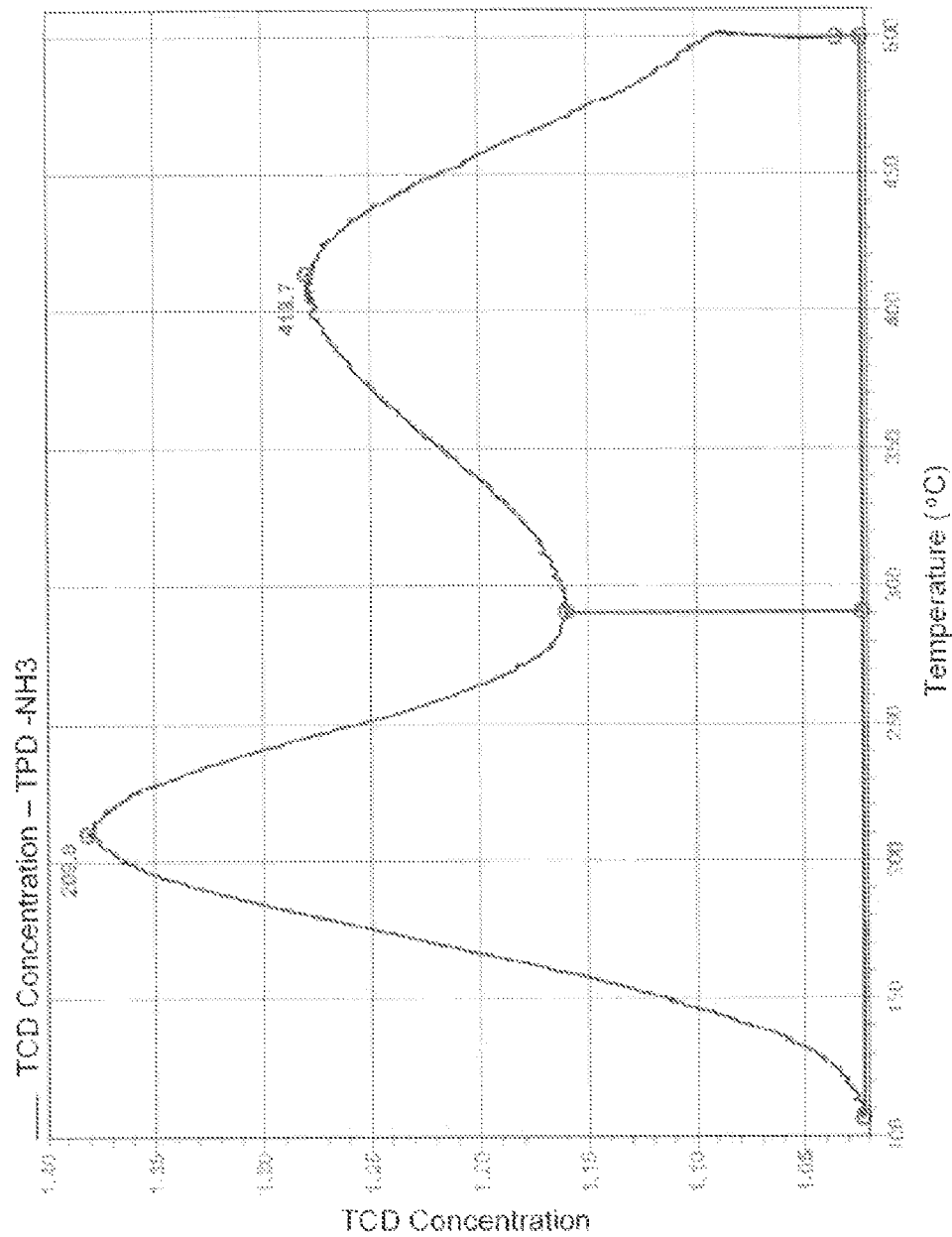
FIGS. 5 and 6 display the temperature-programmed desorption (NH$_3$-TPD) obtained for the crystalline material obtained according to Example 5 as well as for a commercial ZSM-5 material, respectively. In the figure, the temperature in ° C. is shown along the abscissa, and the concentration of desorbed ammonia as measured by the thermal conductivity detector (TCD) is plotted along the ordinate.
Figure 6:
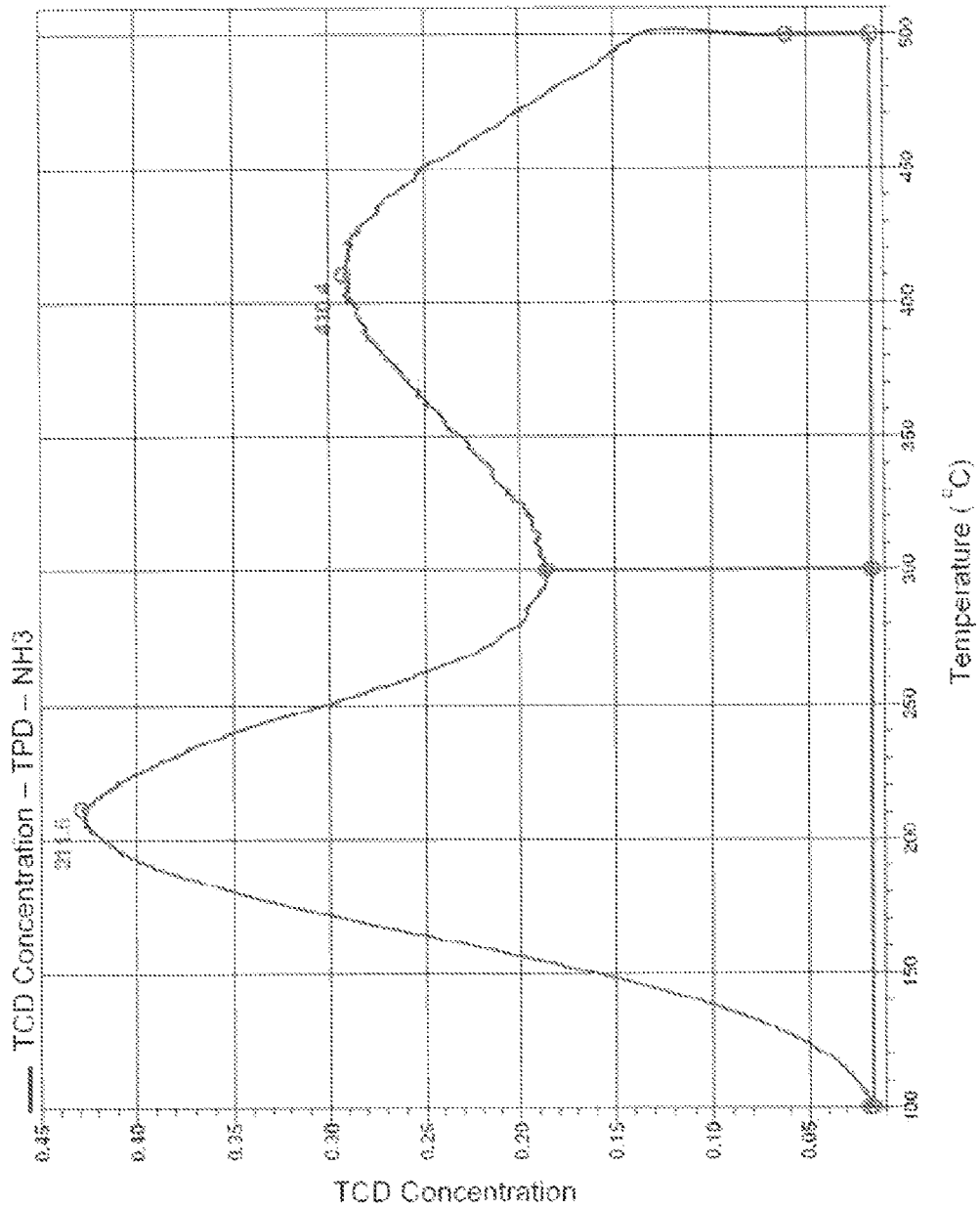

The ammonia temperature-programmed desorption (NH$_3$-TPD) of the material obtained was measured and the results are displayed in FIG. 5, affording a value of 0.71 mmol H$^+$/g. For comparison, the NH$_3$-TPD of a commercial ZSM-5 zeolite (PZ2-50/H obtained from Zeochem) having a similar Si:Al atomic ratio of 25 is displayed in FIG. 6, and affords a value of 0.93 mmol H$^+$/g. As may be taken from FIGS. 5 and 6, the samples display similar types of acid sites, yet quite surprisingly the inventive material displays an overall lower number of acidic sites although the alumina content of both materials is comparable.

Example 6

Synthesis of ZSM-5 with ATPAOH (Isomer Ratio 95:5) Using Aluminum Hydroxide 136.9 ml of 20 wt-% ATPAOH(N-(2-propen-1-yl)-tri-n-propylammonium:N-(1-propen-1-yl)-tri-n-propylammonium molar ratio of 95:5) in distilled H$_2$O was mixed in a 600 ml flask with Aerosil 200 (32.00 g) and Al(OH)$_3$ (0.84 g). The mixture was stirred for 15 minutes. The dispersion was transferred to a 0.25 L autoclave with a teflon inlay, which was afterwards heated to 150° C. for 120 h. After cooling, the formed solid was repeatedly washed with distilled water and dried at 120° C. for 16 h. 30.5 g of a yellowish powder was received which was calcined at 490° C. for 5 h. The molar yield based on SiO$_2$ was calculated to 93%.

The characterization of the powder with an average crystal size of 87 nm+/−17 nm by means of XRD a pure MFI structured material (97% crystallinity). The material has a BET surface area of 430 m$^2$/g, a Langmuir surface area of 574 m$^2$/g, a pore volume of 0.178 cm$^3$/g and a median pore width of 0.63 nm. The elemental analysis showed 40 wt-% Si, 0.67 wt-% Al and 0.22 wt-% C in the sample, thus affording an Si:Al atomic ratio (SAR) of 57. By means of SEM no other side phases could be observed in the product.

The $^{29}$Si MAS NMR of the zeolitic material displays peaks at −105.0 and −113.5 ppm, wherein the integration of the peaks offers relative intensities of 0.156 and 1 for the signals, respectively. In the $^{29}$Si CP-MAS NMR of the zeolitic material, peaks are observed at −91.1, −102.1 and −111.8 ppm, wherein the integration of the peaks offers relative intensities of 0.148, 1.919 and 1 for the signals, respectively.

The $^{27}$Al MAS NMR of the zeolitic material displays peaks at 52.3 and −1.1 ppm, wherein the integration of the peaks offers relative intensities of 1 and 0.008 for the signals, respectively.

Example 7

Synthesis of ZSM-5 with ATPAOH Using Aluminum Sulfate 333 ml of 40 wt-% ATPAOH(N-(2-propen-1-yl)-tri-n-propylammonium:N-(1-propen-1-yl)-tri-n-propylammonium molar ratio of 95:5) in H$_2$O was stirred with tetraethylorthosilicate (757 g) and distilled H$_2$O (470 g) for 60 min at room temperature. Afterwards 746 g of ethanol were removed at 95° C. from the reaction gel by distillation. After cooling down, 746 g H$_2$O as well as Al$_2$(SO$_4$)$_3$*18H$_2$O (24.3 g) dissolved in 20 ml distilled H$_2$O were added. The dispersion was transferred into a 2.5 L autoclave, which was then heated to 155° C. for 24 h. After cooling down to room temperature, the formed solid was repeatedly washed with distilled water and dried at 120° C. for 16 h, 210 g of a white powder was obtained. The organic residuals were removed by calcination at 500° C. for 6 h.

Figure 7:
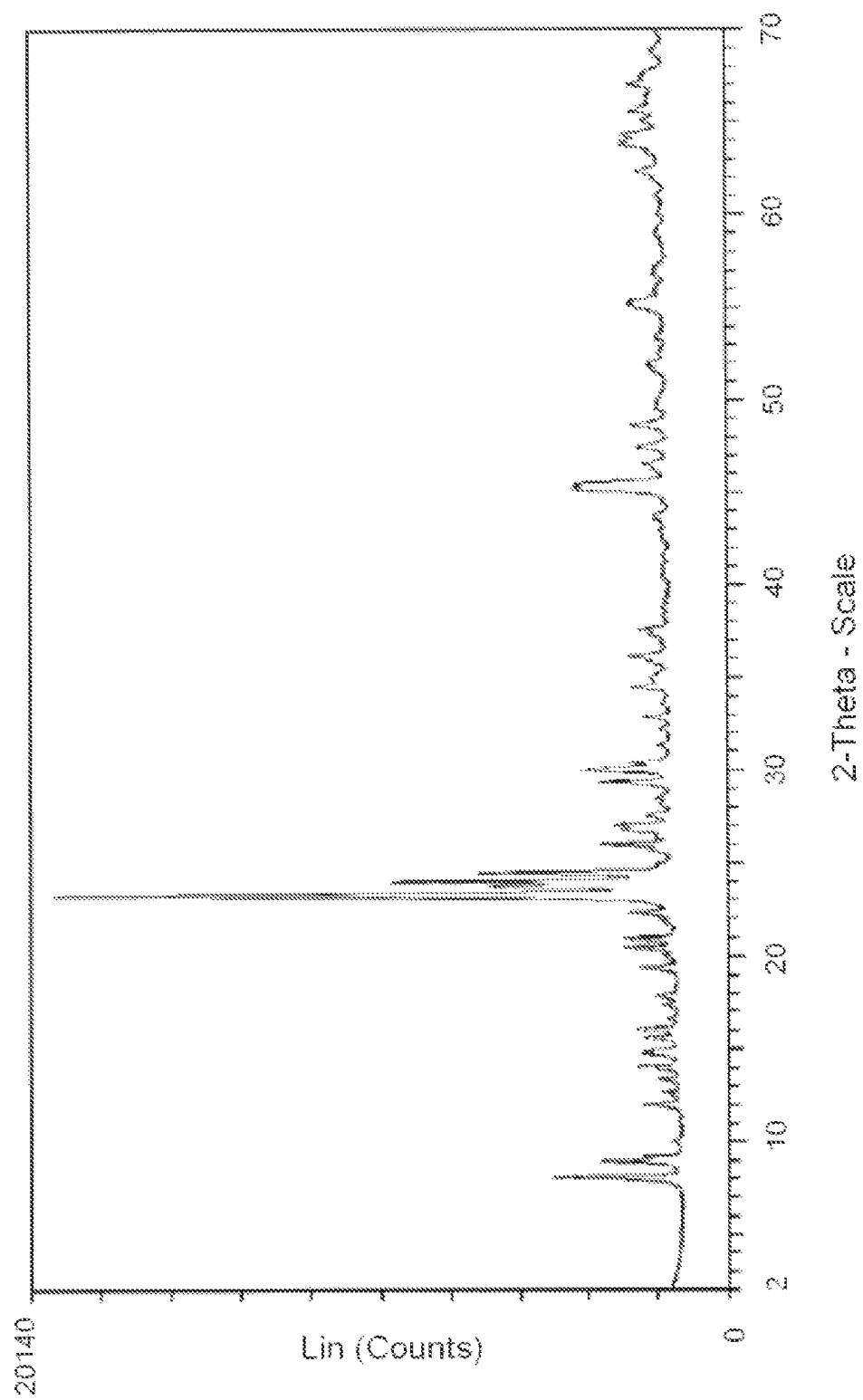

The characterization of the material with a an average crystal size of 83 nm+/−20 nm by means of XRD as displayed in FIG. 7 shows a pure MFI structured material. The material has a surface area of 407 m$^2$/g (BET), a pore volume of 0.190 cm$^3$/g and a median pore width of 0.59 nm. The elemental analysis showed 41 wt-% Si, 0.76 wt-% Al in the sample. By means of SEM and XRD no other side phases could be observed in the product.

Hydrophobic/Hydrophilic Properties

For the TS-1 materials of Examples 1, 2, and 3, the water adsorption isotherms were determined, wherein the adsorption/desorption isotherms for the samples of Examples 1 and 2 are displayed in FIGS. 1b and 2b, respectively. As may be taken from the figures, the water adsorption reaches 2.9 wt.-% for the sample of Example 1, and 8.3 wt.-% for the sample of Example 2. Measurement of the water adsorption isotherm for the sample of Example 3 displays an adsorption reaching 8.7 wt.-%.

For comparison, the water adsorption isotherm was determined for a comparable TS-1 sample (Ti: 1.9 wt.-%; Si: 43 wt.-%; BET surface area: 471 m$^2$/g) obtained using tetrapropyl ammonium as the organotemplate and afforded a water adsorption reaching 10.2 wt.-%. Accordingly, it has quite unexpectedly been found that the materials of the present invention obtained by using the ATPAOH organotemplate are considerably more hydrophobic than a comparable material obtained using tetrapropyl ammonium hydroxide (TPAOH). Furthermore, it may be observed that a higher value of the N-(2-propen-1-yl)-tri-n-propylammonium:N-(1-propen-1-yl)-tri-n-propylammonium molar ratio used in the synthesis of the inventive samples leads to a higher hydrophobicity of the resulting zeolitic material. Thus, the present invention quite unexpectedly provides a material which may be clearly distinguished by its chemical and physical properties from materials obtained using a corresponding alkenyltrialkylammonium organotemplate having only saturated alkyl groups. Furthermore, it has quite surprisingly been found that even a controlled variation of the unique chemical and physical properties of the inventive materials is possible according to the inventive process for their production, offering a unique versatility for chemical applications, in particular in the field of catalysis.

Catalytic Testing

For testing the catalytic behavior of the inventive materials, isopropanol decomposition reactions were performed on the inventive ZSM-5 materials of Examples 4, 5, and 6 as well as on the commercial ZSM-5 materials PZ2-25/H and PZ2-50/H displaying Si:Al atomic ratios (SAR) of 17 and 25, respectively. The test runs were performed at room temperature (no activity) and at temperatures in the range of from 200 to 350° C.

Figure 8:
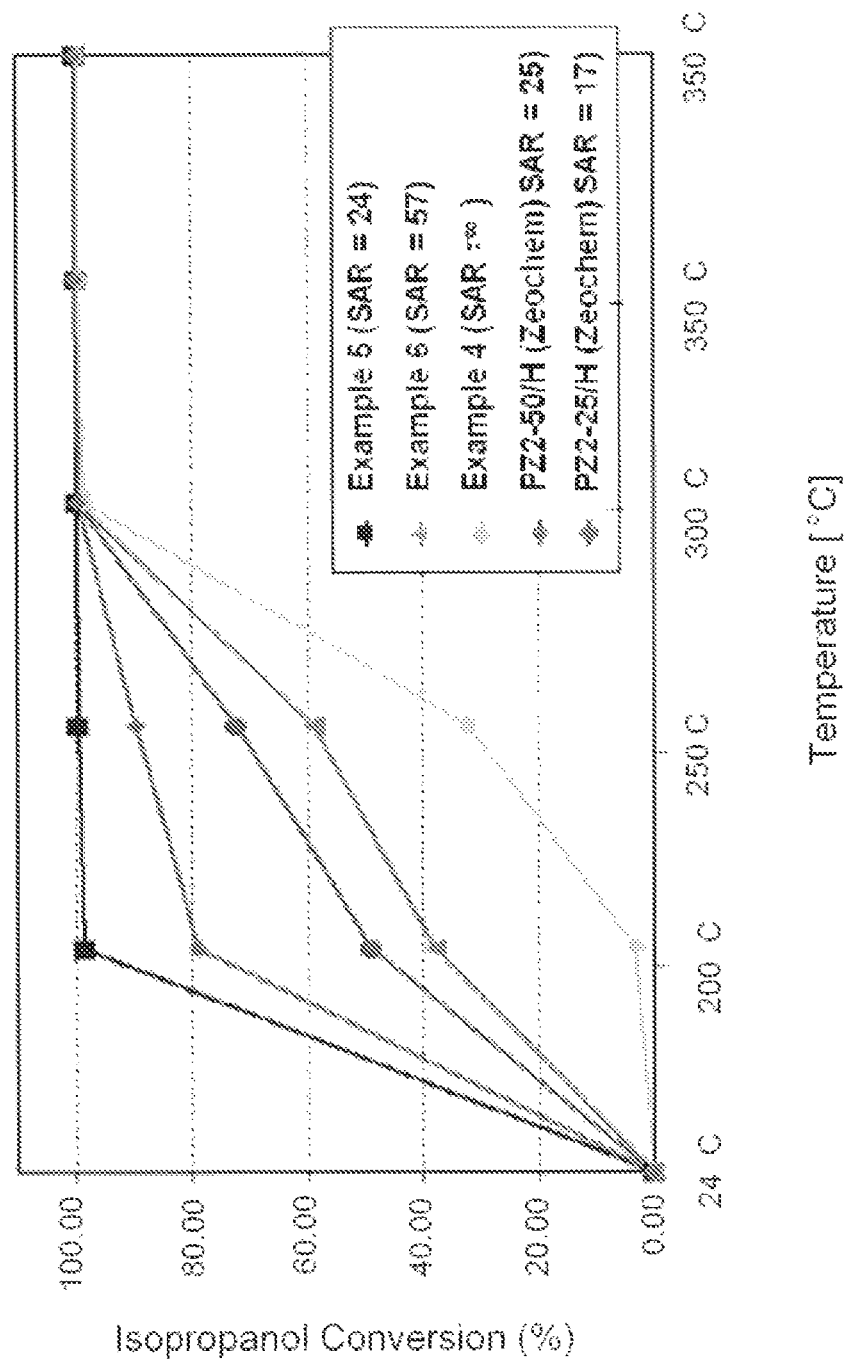
FIG. 8 displays the results for the chemical conversion of isopropanol over the crystalline materials obtained according to Examples 4, 5, and 6 compared to commercial ZSM-materials. In the figure, the temperature in ° C. is shown along the abscissa, and the conversion of isopropanol in % is plotted along the ordinate.

The results from the respective test runs are shown in FIG. 8. In particular, it is apparent from the test results that based on the SAR of the samples, the inventive samples display a considerably higher activity than commercial samples obtained from syntheses using other organotemplates than according to the present invention. This is particularly apparent when comparing the results for Example 5 and PZ2-50/H, the inventive example displaying practically complete conversion at a temperature of around 200° C., wherein the same result is only achieved by the commercial sample at 300° C.

CITED PRIOR ART DOCUMENTS

U.S. Pat. No. 3,702,886
U.S. Pat. No. 4,410,501
US 2007/0135637 A1
US 2008/0000354 A1
U.S. Pat. No. 8,007,763 B2
WO 2008/083045 A2
WO 2007/021404 A1
U.S. Pat. No. 4,544,538

The invention claimed is:

1. A synthetic zeolitic material having an MFI-type framework structure obtained by a process, comprising:
  crystallizing a mixture comprising a YO$_2$ source and a structure directing agent comprising an alkenyltrialkylammonium cation R$^1$R$^2$R$^3$R$^4$N$^+$-comprising compound, to obtain a zeolitic material;
  wherein Y is a tetravalent element,
  R$^1$, R$^2$, and R$^3$ are each independently an alkyl; and
  R$^4$ is an alkenyl;
  and wherein
  a BET surface area of the synthetic zeolitic material determined according to DIN 66135 is from 50 to 700 m$^2$/g, and
  a maximum water absorption of the synthetic zeolitic material is from 2.9 wt % to 8.7 wt %.

2. A synthetic zeolitic material having an MFI-type framework structure comprising YO$_2$ and optionally comprising X$_2$O$_3$,
  wherein Y is a tetravalent element, and X is a trivalent element,
  the synthetic zeolite material has an X-ray diffraction pattern comprising the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern, and wherein
  a BET surface area of the synthetic zeolitic material determined according to DIN 66135 is from 50 to 700 m$^2$/g, and
  a maximum water absorption of the synthetic zeolitic material is from 2.9 wt % to 8.7 wt %.

3. The zeolitic material of claim 2, wherein e $^{29}$Si MAS NMR of the zeolitic material comprises:
  a first peak (P″1) in the range of from −110.4 to −114.0 ppm; and
  a second peak (P″2) in the range of from −100.2 to −104.2 ppm.

4. A synthetic zeolitic material having an MFI-type framework structure comprising YO$_2$ and optionally comprising X$_2$O$_3$,
  wherein Y is a tetravalent element, and X is a trivalent element,
  the synthetic zeolite material has an X-ray diffraction pattern comprising the following reflections:

| Intensity (%) | Diffraction angle 2θ/° [Cu K(alpha |
|---|---|
| 15-55 | 7.88-8.16 |
| 11-35 | 8.83-9.13 |
| 100 | 23.04-23.46 |
| 27-40 | 23.68-23.89 |
| 21-66 | 23.90-24.23 |
| 22-44 | 24.29-24.71 | wherein 100% relates to the intensity of the maximum peak in the X-ray powder diffraction pattern, and wherein a BET surface area of the synthetic zeolitic material determined according to DIN 66135 is from 50 to 700 m$^2$/g, and a maximum water absorption of the synthetic zeolitic material is from 2.9 wt % to 8.7 wt %.

5. The zeolitic material of claim 4, wherein the $^{29}$Si MAS NMR of the zeolitic material comprises:

a first peak (P1) in the range of from −110.4 to −114.0; and a second peak (P2) in the range of from −101.4 to −106.8 ppm.

6. The zeolitic material of claim 5, wherein the deconvoluted $^{29}$Si MAS NMR spectrum further comprises an additional peak comprised in the range of from −113.2 to −115.2 ppm.

7. The zeolitic material of claim 5, wherein at least a portion of the Y atoms and/or of the X atoms in the MFI-type framework structure is isomorphously substituted by one or more elements selected from the group consisting of B, Fe, Ti, Sn, Ga, Ge, Zr, V, Nb, Cu, Zn, Li, and Be.

8. The zeolitic material of claim 7, wherein molar ratio of YO$_2$ to the one or more element ranges from 5 to 100.

9. The zeolitic material of claim 4, wherein the $^{22}$Al MAS NMR of the zeolitic material comprises:

a first peak (P'1) in the range of from 50.00 to 53.50 pp; and a second peak (P'2) in the range of from −0.50 to −2.00 ppm, wherein the integration of the first and second peaks in the $^{27}$Al MAS NMR of the zeolitic material provides a ratio of the integration values P'1:P'2 of 1:(0.5-1.2).

10. The zeolitic material of claim 4, wherein the YO$_2$: X$_2$O$_3$ molar ratio ranges from 2 to 200.

11. The zeolitic material of claim 4, wherein MFI-type framework structure of the zeolitic material does not comprise X$_2$O$_3$.

12. The zeolitic material of claim 4, wherein Y is Si, Sn, Ti Zr, Ge, or any mixture thereof.

13. The zeolitic material of claim 4, wherein X is Al, B, In, Ga or any mixture thereof.

14. The zeolitic material of claim 4, wherein the zeolitic material farther comprises a cation and/or cationic element as ionic non-framework element.

* * * * *